(12) United States Patent
Mathew et al.

(10) Patent No.: US 10,164,971 B2
(45) Date of Patent: Dec. 25, 2018

(54) END USER INITIATED ACCESS SERVER AUTHENTICITY CHECK

(71) Applicant: Oracle International Corporation, Redwood Shores, CA (US)

(72) Inventors: Stephen Mathew, Bangalore (IN); Ramya Subramanya, Bangalore (IN); Vipin Anaparakkal Koottayi, Trikarpur (IN)

(73) Assignee: Oracle International Corporation, Redwood Shores, CA (US)

( * ) Notice: Subject to any disclaimer, the term of this patent is extended or adjusted under 35 U.S.C. 154(b) by 357 days.

(21) Appl. No.: 14/920,807

(22) Filed: Oct. 22, 2015

(65) Prior Publication Data

US 2017/0118202 A1    Apr. 27, 2017

(51) Int. Cl.
    *H04L 29/06*        (2006.01)
    *G06F 21/44*        (2013.01)

(52) U.S. Cl.
    CPC ........ *H04L 63/0846* (2013.01); *G06F 21/445* (2013.01); *H04L 63/0838* (2013.01);
    (Continued)

(58) Field of Classification Search
    CPC .............................. H04L 63/102; G06F 21/455
    (Continued)

(56) References Cited

U.S. PATENT DOCUMENTS 6,246,769 B1   6/2001 Kohut
6,412,077 B1   6/2002 Roden et al.
(Continued)

FOREIGN PATENT DOCUMENTS

CN    104660412 A    5/2015
EP    2743857        6/2014
(Continued)

OTHER PUBLICATIONS

U.S. Appl. No. 14/671,935, Non-Final Office Action dated Sep. 22, 2016, 22 pages.
(Continued)

*Primary Examiner* — Lynn D Feild
*Assistant Examiner* — Dereena T Cattungal
(74) *Attorney, Agent, or Firm* — Kilpatrick Townsend & Stockton LLP

(57) ABSTRACT

Techniques are disclosed for enabling a user to validate the authenticity of a computing system (e.g., an access management system) such as one which controls access to one or more resources. A user can determine the authenticity of an access management system before the user provides credential information to the access management system. A user can be presented at a client system with an interface to request authentication of an access management system. The access management system may provide the user at the client system with temporary access information to submit back to the access management system. The access management system may provide recent personal information to the user at the client system to verify the access management system. Upon verification of the personal information, the access management system may prompt the user for credential information to establish a session.

20 Claims, 12 Drawing Sheets

(52) U.S. Cl.
CPC ........ *H04L 63/0869* (2013.01); *H04L 63/102* (2013.01); *H04L 63/18* (2013.01); *H04L 2463/082* (2013.01)

(58) Field of Classification Search
USPC .......................................................... 726/7
See application file for complete search history.

(56) References Cited

U.S. PATENT DOCUMENTS

| | | |
|---|---|---|
| 6,892,307 B1 | 5/2005 | Wood et al. |
| 6,950,949 B1 | 9/2005 | Gilchrist |
| 7,086,085 B1 | 8/2006 | Brown et al. |
| 7,523,309 B1 | 4/2009 | Talbot et al. |
| 7,562,222 B2 | 7/2009 | Gasparini et al. |
| 7,904,946 B1 | 3/2011 | Chu et al. |
| 8,010,996 B2 | 8/2011 | Cline et al. |
| 8,122,251 B2 | 2/2012 | Santos et al. |
| 8,141,140 B2 | 3/2012 | Wenzel et al. |
| 8,281,379 B2 | 10/2012 | Noe |
| 8,302,167 B2 | 10/2012 | Mennes et al. |
| 8,312,519 B1 | 11/2012 | Bailey et al. |
| 8,327,422 B1 | 12/2012 | Friedman et al. |
| 8,453,224 B2 | 5/2013 | Mutt |
| 8,555,355 B2 * | 10/2013 | Rathbun ............... H04L 9/3213 726/11 |
| 8,578,476 B2 | 11/2013 | Sama |
| 8,625,796 B1 | 1/2014 | Ayed |
| 8,627,438 B1 | 1/2014 | Bhimanaik |
| 8,763,097 B2 | 6/2014 | Bhatnagar et al. |
| 8,843,997 B1 | 9/2014 | Hare |
| 8,856,892 B2 | 10/2014 | Faludi |
| 8,898,765 B2 | 11/2014 | Goyal et al. |
| 9,864,944 B2 * | 1/2018 | Radu ............... G06K 19/07701 |
| 2003/0070091 A1 | 4/2003 | Loveland |
| 2004/0128561 A1 | 7/2004 | Bouchat et al. |
| 2004/0167984 A1 | 8/2004 | Herrmann |
| 2004/0215750 A1 | 10/2004 | Stilp |
| 2005/0015594 A1 | 1/2005 | Ashley et al. |
| 2005/0156947 A1 | 7/2005 | Sakai et al. |
| 2006/0056415 A1 | 3/2006 | Lee et al. |
| 2006/0145842 A1 | 7/2006 | Stilp |
| 2006/0274920 A1 | 12/2006 | Tochikubo et al. |
| 2007/0136573 A1 * | 6/2007 | Steinberg ............... G06F 21/32 713/155 |
| 2007/0199053 A1 * | 8/2007 | Sandhu .................. G06F 21/31 726/4 |
| 2007/0200597 A1 * | 8/2007 | Oakland .................. G06F 1/10 326/46 |
| 2008/0148351 A1 | 6/2008 | Bhatia et al. |
| 2009/0037763 A1 | 2/2009 | Adhya et al. |
| 2009/0288148 A1 | 11/2009 | Headley et al. |
| 2009/0292927 A1 | 11/2009 | Wenzel et al. |
| 2010/0146263 A1 | 6/2010 | Das et al. |
| 2011/0320616 A1 | 12/2011 | Wray |
| 2011/0320820 A1 | 12/2011 | Wray |
| 2012/0066749 A1 | 3/2012 | Taugbol et al. |
| 2012/0203906 A1 | 8/2012 | Jaudon et al. |
| 2012/0314862 A1 | 12/2012 | Min |
| 2013/0111208 A1 | 5/2013 | Sabin et al. |
| 2013/0159732 A1 | 6/2013 | Leoutsarakos et al. |
| 2013/0185209 A1 | 7/2013 | Ahn |
| 2013/0198613 A1 | 8/2013 | Scoda |
| 2013/0205373 A1 | 8/2013 | Jaudon et al. |
| 2013/0219479 A1 | 8/2013 | DeSoto et al. |
| 2013/0290719 A1 | 10/2013 | Kaler et al. |
| 2014/0082706 A1 | 3/2014 | Banford |
| 2014/0096190 A1 | 4/2014 | Subramanya et al. |
| 2014/0208386 A1 | 7/2014 | Sama |
| 2014/0214688 A1 * | 7/2014 | Weiner ............... G06Q 20/3227 705/71 |
| 2014/0250490 A1 | 9/2014 | Baca et al. |
| 2014/0279445 A1 | 9/2014 | Jiang et al. |
| 2015/0121503 A1 | 4/2015 | Xiong |
| 2015/0150110 A1 | 5/2015 | Canning et al. |
| 2015/0222615 A1 | 8/2015 | Allain et al. |
| 2015/0249540 A1 | 9/2015 | Khalil et al. |
| 2015/0304847 A1 | 10/2015 | Gong et al. |
| 2016/0063226 A1 | 3/2016 | Singh et al. |
| 2016/0065554 A1 | 3/2016 | Brown et al. |
| 2016/0285871 A1 | 9/2016 | Chathoth et al. |
| 2016/0379431 A1 | 12/2016 | Borg et al. |
| 2017/0034152 A1 | 2/2017 | Subramanya et al. |
| 2017/0118025 A1 | 4/2017 | Shastri et al. |
| 2017/0118223 A1 | 4/2017 | Mathew et al. |
| 2017/0126733 A1 | 5/2017 | Mathew et al. |

FOREIGN PATENT DOCUMENTS

| | | |
|---|---|---|
| WO | 2012156785 A1 | 11/2012 |
| WO | 2014/041336 A1 | 3/2014 |
| WO | 2017069800 | 4/2017 |
| WO | 2017070412 | 4/2017 |

OTHER PUBLICATIONS

"Single Sign-On (SSO)" [site visited Jun. 22, 20015] https://support.ca.com/cadocs/0/CA%20SiteMinder%2012%2052%20SP1-ENU/Bookshelf_Files/HTML/idocs/index.htm?toc.htm?256655.html?intcmp=searchresultclick&resultnum=817, 5 pages.

"Mapping Fed Authn Methods to Authn Levels in OIF / SP" http://prsync.com/oracle/mapping-fed-authn-methods-to-authn-levels-in-oif--sp-624805/ (Jul. 17, 2014), 5 pages.

Puhalla "OpenAM Session Upgrade" http://blog.profiq.cz/2012/09/21/openam-session-upgrade-overview/ (Sep. 21, 2012), 3 pages.

"OpenID Connect Single Sign-On (SSO)" Connect2id Ltd. http://connect2id.com/products/server/single-sign-on (Copyright 2015), 1 page.

"Configuring Authentication Mechanisms" SAP SE [site visited Jun. 22, 20015] https://help.sap.com/saphelp_nw70ehp1/helpdata/en/8f/ae29411ab3db2be10000000a1550b0/frameset.htm 2 pages.

"Designing a good security policy for your websites" http://programmergamer.blogspot.in/2013_04_01_archive.html(Apr. 29, 2013) 4 pages.

"Problems viewing or passing CAPTCHA verification" [site visited Jun. 19, 2015] https://help.yahoo.com/kb/SLN2662.html, 1 page.

"One Strong Authentication Solution for Every CA SSO Application" [site visited Jun. 19, 2015] http://www.idfconnect.com/products/sso-mobilekey/, 1 page.

"Show PHP Captcha on Failed Login Attempts" phppot.com http://phppot.com/php/show-php-captcha-on-failed-login-attempts/ (copyright 2008-2014), 6 pages.

Sani "Preventing Brute Force Login Attacks to the Citrix NetScaler Gateway/AAA-TM Login Pages" http://blogs.citrix.com/2012/02/01/preventing-brute-force-login-attacks-to-the-citrix-netscaler-access-gateway-or-aaa-for-tm-login-page-%E2%80%93-part-1/(Feb. 1, 2012), 6 pages.

"How to Configure a Separate Maximum Failure Counter and Threshold for OTP Authentication" [site visited Jun. 18, 2015] https://support.ca.com/cadocs/0/CA%20SiteMinder%2012%2052%20SP1-ENU/Bookshelf_Files/HTML/idocs/index.htm?toc.htm?1945685.html?intcmp=searchresultclick&resultnum=1805, 2 pages.

*McAfee One Time Password 3.5 Administration Guide* https://kc.mcafee.com/resources/sites/MCAFEE/content/live/PRODUCT_DOCUMENTATION/24000/PD24538/en_US/OTP_3_5_admin_guide.pdf (Copyright 2013)120 pages.

"Overload Protection" Paessler AG http://kb.paessler.com/en/topic/25523-what-is-overload-protection(Sep. 28, 2011), 9 pages.

International Application No. PCT/US2016/058016, International Search Report and Written Opinion dated Dec. 7, 2016, 13 pages.

U.S. Appl. No. 14/671,935, Final Office Action dated Mar. 23, 2017, 24 pages.

U.S. Appl. No. 14/671,935, Non-Final Office Action dated Aug. 28, 2017, 26 pages.

DirX Access V8.3 Web Access Management and Identity Federation. Technical Data Sheet [online]. Dec. 2013, Copyright 2013 Atos

(56) References Cited

OTHER PUBLICATIONS

[retrieved on Sep. 4, 2014]. Retrieved from the Internet: <URL: http://atos.net/content/dam/global/documents/we-do/atos-dirx-access-v83-datasheet.pdf>, 14 pages.
eToken 3500—OTP Banking Token. safenet-inc.com [online]. Copyright 2006-2015 Gemalto NV [site visited Sep. 4, 2014]. Retrieved from the Internet: <URL: http://www.safenet-inc.com/multi-factor-authentication/authenticators/one-time-password-otp/etoken-3500-banking-token/#content-left>, 2 pages.
HSBC Internet Banking Terms and Conditions. hsbc.co.in [online]. Copyright 2015, The Hongkong and Shanghai Banking Corporation Limited, India (HSBC India) [site visited Sep. 4, 2014]. Retrieved from the Internet: <URL: http://www.hsbc.co.in/1/2/ALL_SITE_PAGES/HUB_PIB/PIB_TERMS_AND_CONDITIONS#pib 5>, 30 pages.
JPMorgan ACCESS$^{SM}$ Security Features. Datasheet [online]. Copyright 2008 JPMorgan Chase & Co., Jun. 2008. Retrieved from the Internet: <URL: https://www.jpmorgan.com/cm/BlobServer?blobcol=urldata&blobtable=MungoBlobs&blobkey=id&blobwhere=1158520944481&blobheader=application%2Fpdf&blobnocache=true&blobheadername1=Content-disposition&blobheadervalue1=attachment;filename=FirstCash-C_JPMA_Sec Features.pdf>, 2 pages.
New Security Token FAQs. maybank2u.com.sg [online]. Copyright 2015 Maybank, Malayan Banking Berhad, Sep. 4, 2014 [site visited Sep. 4, 2014]. Retrieved from the Internet: <URL: http://info.maybank2u.com.sg/eservices/personal/faq/faq-security-token.aspx>, 10 pages.
OTP c600 Secure Transaction Signing + OTP Mobile Token. Datasheet. rockey.com.my [online]. Softkey E-Solution SDN BHD [site visited Sep. 5, 2014]. Retrieved from the Internet: <URL: http://www.rockey.com.my/wordpress/one-time-password-authentication-token/otp-c600>, 2 pages.
Ricci, Antonio. 'Facing authentication threats: one time passwords and transaction signing.' Security Community Blog [online]. Copyright 2015 Symantec Corporation, Mar. 28, 2013 [site visited Sep. 4, 2014]. Retrieved from the Internet: <URL: http://www.symantec.com/connect/blogs/facing-authentication-threats-one-time-passwords-and-transaction-signing>, 4 pages.

SolidPass Frequently Asked Questions FAQ. solidpass.com [online]. SolidPass™ [site visted Sep. 4, 2014]. Retrieved from the Internet: <URL: http://www.solidpass.com/frequently-asked-questions-faq.html>, 3 pages.
YESsafe Mobile Token. Datasheet. i-sprint.com [online]. Copyright 2015 i-Sprint Innovations [site visited Sep. 4, 2014]. Retrieved from the Internet: <URL: http://www.i-sprint.com/wp-content/uploads/yessafe_token.pdf>, 2 pages.
International Search Report and Written Opinion for patent application PCT/US2016/025402 dated Jul. 18, 2016, 14 pages.
Dhamija et al., "Phish and HIPs: Human Interactive Proofs to Detect Phishing Attacks", Second International Workshop on Human Interactive Proofs (HIP 2005), pp. 127-141 (May 1, 2005).
Youll "Fraud Vulnerabilities in SiteKey Security at Bank of America," http://cr-labs.com/publications/SiteKey-28068718.pdf (Jul. 18, 2006), 16 pages.
IBM Worklight application authenticity overview. IBM.com [online]. IBM Corporation [retrieved Feb. 6, 2015]. Retrieved from the Internet: <URL: http://www-01.ibm.com/support/knowledgecenter/SSZH4A_6.1.0/com.ibm.worklight.dev.doc/dev/c_ibm_worklight_app_authentication_overview.html>, 3 pages.
Lee, Chern, 14.8 OpenSSH. FreeBSD Handbook [online]. Copyright 1995-2015 The FreeBSD Document Project [retrieved Feb. 4, 2015]. Retrieved from the Internet: <URL: https://www.freebsd.org/doc/handbook/openssh.html>, 7 pages.
U.S. Appl. No. 14/671,935, Final Office Action dated May 2, 2018, 6 pages.
U.S. Appl. No. 15/294,381, First Action Interview Pilot Program Pre-Interview Communication dated May 21, 2018, 6 pages.
U.S. Appl. No. 15/298,624, Non-Final Office Action dated May 31, 2018, 15 pages.
International Application No. PCT/US2016/058016, International Preliminary Report on Patentability dated May 3, 2018, 10 pages.
U.S. Appl. No. 15/294,381, First Action Interview Office Action Summary dated Aug. 16, 2018, 5 pages.
U.S. Appl. No. 15/299,950, Notice of Allowance dated Aug. 30, 2018, 19 pages.
U.S. Appl. No. 14/671,935, Notice of Allowance dated Oct. 22, 2018, 13 pages.

\* cited by examiner

END USER INITIATED ACCESS SERVER AUTHENTICITY CHECK

BACKGROUND

Generally, the present application relates to data processing. More specifically, the application is related to techniques for enabling a user to validate the authenticity of a computing system which controls access to resources.

Modern businesses rely on a variety of applications and systems that control and generate information that is critical to business operations. Different applications often provide different services and information, and different users may require access to different levels of information within each system or application. The level of access that users are granted may depend on the role of the user. For example, a manager may need access to certain information about employees that report to him, but it may be improper for that manager to access the same information about those whom he reports to.

Earlier, less sophisticated applications incorporated access management business logic directly into the application code. That is to say, each application would require users to have a separate account, separate policy logic, and separate permissions, for example. Furthermore, when a user is authenticated by one of these applications, this authentication remains unknown to other applications in the enterprise because the fact that authentication with the first application has taken place is not shared. Thus, there is no concept of trust between applications using different systems for authentication and access control. Engineers quickly realized that having an access management system for each application in an enterprise was much like having a gas station for each car, and determined that authentication and access control would be more efficiently implemented and managed as a shared resource. These shared resources became known as an access management systems.

Access management systems often use policies and other business logic to make a determination regarding whether a particular access request should be granted to a particular resource. Upon making a determination that access should be granted, a token is provided to the requestor. This token is like a key that can be used to open a door that guards restricted data. For example, a user may attempt to access a human resources database to gather information about certain employees such as salary information. The user's web browser makes a request to the application, which requires authentication. If the web browser does not have a token, the user is asked to log in to the access management system. When the user is authenticated, the user's browser receives a cookie that represents a token that may be used to access the human resources application.

In an enterprise, users (e.g., employees) typically may have access to one or more different systems and applications. Each of these systems and applications may utilize different access control policies and require different credentials (e.g., user names and passwords). single sign-on (SSO) can provide a user with access to multiple systems and applications after an initial login. For example, when the user logs-in to their work computer, the user can then also have access to one or more other resources, such as systems and applications. An access management system may challenge a user to verify his/her identity to determine access to a resource. The user may be challenged for information based on a combination of "what you have," "what you know," and "who you are."

Access management systems can prompt a user with a graphical user interface on a client device to challenge the user for information to verify the user's credentials. Sometimes, information requested of a user may include sensitive, confidential information, which if comprised, may threaten the identity and personal information (e.g., financial information or account information) of the individual. As a result, users may be hesitant to provide sensitive information to a system, such as a server, to gain access to resources, without being sure that the system requesting the information does actually control access to those resources.

With on-going technology-based advances in identity theft using techniques such as spoofing and phishing, users are even more reluctant to provide their credentials without a way to verify the source of the request for credentials. For example, an access management system may provide private information to the user to let the user determine the authenticity of the access management system based on the private information. However, in this scenario, spoofing and phishing systems may have access to personal information that can be used to lure the user into believing that the system requesting authentication is legitimate. In another example, an access management system may contact another device with a special code for additional verification. However, spoofing systems may have access to a user's contact information, and may use such information to send additional verification information. In yet another example, a phishing or a spoofing system may try to deceive a user by obtaining credential information through a collection page that is not controlled by an access management system. In one scenario, on a client system, a malicious browser plug-in may be activated to act as an access management system to falsely request access credentials from a user.

In some instances, a client system may receive a one-time code (e.g., password) to enable the user operating the client system to access a resource via the access management system. The client system, if compromised or stolen, may enable a user operating the client system to obtain unauthorized access to a resource using the one-time code. Some techniques for identity theft may be used to intercept communications between a client system operated by a user and an access management system. The intercepted communications may be used to solicit identity or access information from a user.

Access management solutions may be challenged to provide users with the ability to enable the user to initiate validation of the system providing access management facilities. New techniques are desired for enabling a user to determine the authenticity of a system requesting credential information to access resources.

BRIEF SUMMARY

The present disclosure relates generally to managing access to resources. Certain techniques are disclosed for enabling a user to validate the authenticity of a computing system (e.g., an access management system) such as one which controls access to one or more resources. Specifically, techniques are disclosed for enabling a user to determine the authenticity of an access management system before the user provides credential information to the access management system.

Embodiments disclosed here in enable a user to verify the authenticity of an access management system using information. The information may be different each time and user can use this up-to-date information to verify the authenticity of the access server. The exchange of data between the access management system and a client system may be analogized as a three-way handshake between the end user and the access management system. Hence, the access management system need not give away any confidential information unless the user proves himself with temporary data. The techniques described here prevent the security risks exposed for use of stolen cards or mobile devices by challenging the user for temporary data ("what you have") and a password ("what you know"). The three-way handshake ensures that authentication is flawless from the end user's perspective as well as from the access server side.

In some embodiments, a user can be presented at the client system with an interface, such as a graphical user interface (GUI), which enables the user to request authentication of an access management system. The interface may be presented before credential information is requested from the user to access a resource controlled by the access management system. By verifying the authencity of the access management system, the user can be assured that the credential information is not provided to a computing system controlled by an unauthorized user. By enabling the user to validate the authenticity of the access management system, the user can ensure that credential information and other confidential information is not compromised to an unauthorized party or entity. The user can also be ensured that the access management system itself has not been compromised such that upon providing credentials, the recipient of those credentials can gain unauthorized access to desired resources.

In an aspect of the invention, an interface to request system validation may ask for identification information of a user to initiate system validation. The identification information may enable the access management system to identify the user to determine contact information for communication of validation information. The contact information may correspond to one or more destinations (e.g., an email address or a different device) with which an access management system may communicate as part of system validation.

During system validation, the access management system may send temporary data (e.g., temporary access information) that is constraint by one or more criteria, such as time. The temporary access information may be sent to the client system requesting system validation and/or any destinations associated with the user. The access management system may request the temporary access information via the interface as par of the system validation process. The access management system can verify the temporary data to determine whether it matches that which was sent to the user.

Upon verifying that the temporary data matches that which was previously sent to the user, the access management system may send personal information to the user as part of system validation. The personal information may include sensitive, confidential information (e.g., current financial information) that may not be known by unauthorized users. The personal information may be sent to the client system and/or the destination(s) associated with the user. Through an interface, the user can indicate whether the personal information is correct. The confidential information may be that which is known only to the user and the access management system. The confidential information may include information that is less likely if not impossible for other external computing systems to intercept, guess, or obtain fraudulently.

Through the interface, the user can provide credential information upon verifying the personal information. The credential information may be used to determine authentication of the user as part of the system validation process. Upon successful validation of the user based on the credentials, the access management system may establish a session for the user to enable access to resources.

In some embodiments, an access management system may include a computing system that is configured to implement methods and operations described herein. Yet other embodiments relate to systems and machine-readable tangible storage media which employ or store instructions for methods and operations described herein.

In at least one embodiment, a method may include receiving, from a computing device operated by a user, a validation request to authenticate the access management system, the validation request including user identification information associated with the user. The method may include sending to a destination associated with the user based on the user identification information, temporary access information for the user to authenticate the access management system. A destination may be the computing device. A destination may be a device associated with the user. The device may be different from the computing device. The method may include receiving a first response including the temporary access information. The method may include, upon verifying the temporary access information received in the first response, sending, by the computing system, personal information about the user to the computing device. The method may include receiving, from the computing device, a second response, the second response indicating a confirmation by the user of the personal information and the second response including credential data of the user. The method may include determining authentication of the user to access the resource from the computing device. The authentication may be determined based on the credential data and the confirmation of the personal information received in the second response.

In some embodiments, the method may include upon determining that the user is not authenticated to access the resource from the computing device, sending, to the computing device, a request for credential information of the user. The computing device may send the validation request in response to the request for credential information.

In some embodiments, the first response may be received from the destination.

In some embodiments, the method may include determining that the user identification information is associated with the user; and identifying the destination based on the user identification information.

In some embodiments, the temporary access information is associated with a time period. Verifying the temporary access information may include determining a response time is within the time period. The response time may be based on a time for receiving the first response after the temporary access information is sent to the computing device.

In some embodiments, the method may include, upon verifying the temporary access information received in the first response, generating the personal information before sending the personal information.

In some embodiments, the personal information includes financial information about the user determined after the temporary access information is verified.

The foregoing, together with other features and embodiments will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

The present disclosure relates generally to providing single sign-on (SSO) access. A SSO session may provide a user with access to one or more systems after an initial authentication based on authentication of credential information (e.g., a username and a password). Access to a system may provide access to one or more resources. Resources may include any item managed and/or stored by a computing system, such as an application, a document, a file, electronic content, and/or the like. A resource may be identified by a uniform resource locator (URL) or other data indicating a source of the resource.

Certain techniques are disclosed for enabling a user to validate the authenticity of a computing system (e.g., an access management system) such as one which controls access to one or more resources. Specifically, techniques are disclosed for enabling a user to determine the authenticity of an access management system before the user provides credential information to the access management system.

Embodiments disclosed here in enable a user to verify the authenticity of an access management system using information. The information may be different each time and user can use this up-to-date information to verify the authenticity of the access server. The exchange of data between the access management system and a client system may be analogized as a three-way handshake between the end user and the access management system. Hence, the access management system need not give away any confidential information unless the user proves himself with temporary data. The techniques described here prevent the security risks exposed for use of stolen cards or mobile devices by challenging the user for temporary data ("what you have") and a password ("what you know"). The three-way handshake ensures that authentication is flawless from the end user's perspective as well as from the access server side.

Figure 1:
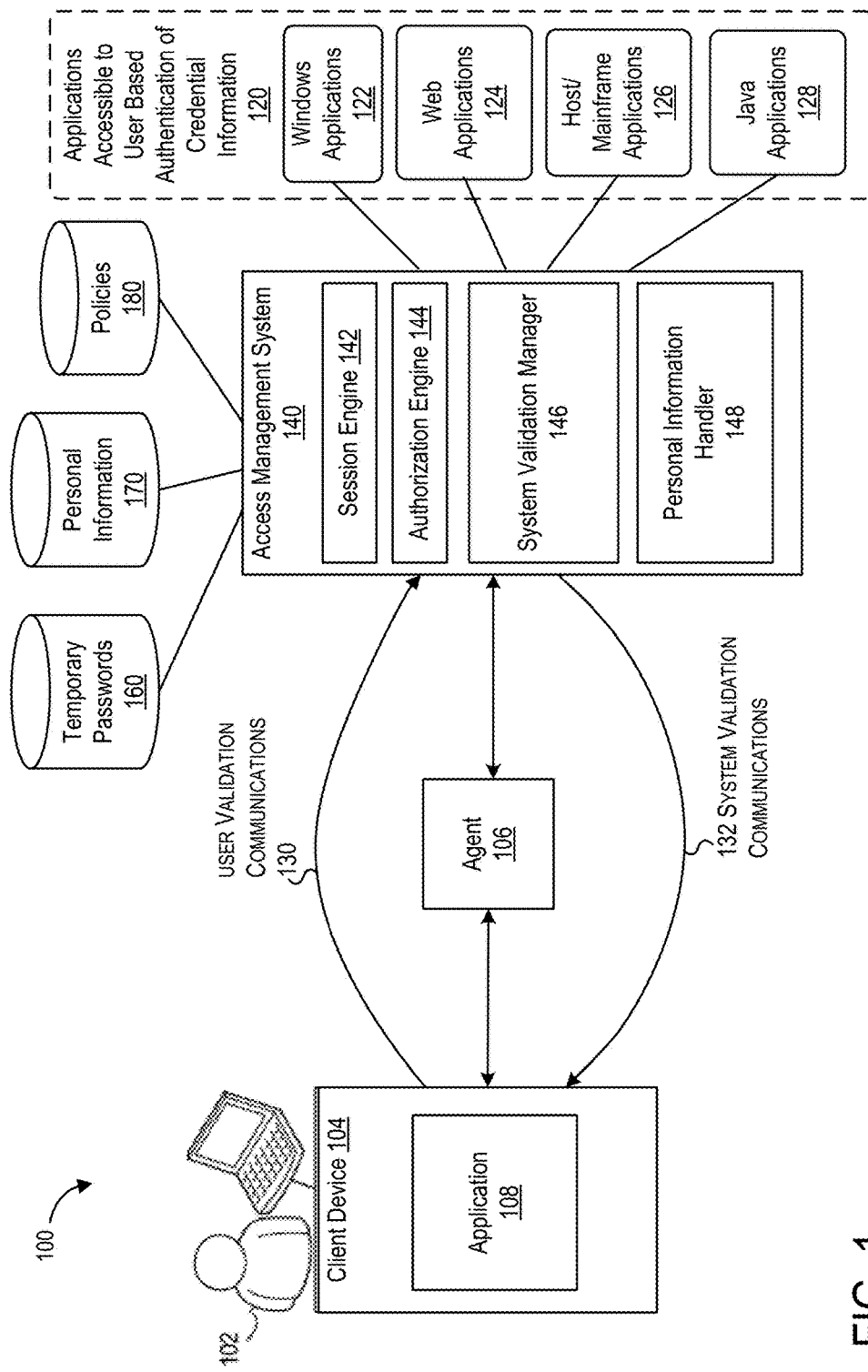
FIG. 1 illustrates a high-level diagram of a system for enabling a user to validate the authenticity of an access management system, in accordance with an embodiment.

Some embodiments, such as systems, methods, and machine-readable media are disclosed for enabling a user to validate the authenticity of an access management system. FIG. 1 illustrates a system 100 in which a user (e.g., user 102) with access to resources accessible in a session can initiate a process to validate the authenticity of an access management system 140. A user may desire to validate the authenticity of an access management system, or any computing system, to ensure that access information (e.g., a password or confidential information) is not compromised to an unauthorized system. For purposes of illustration, "session" as described herein includes an SSO session; however, a session may include other types of sessions enabling access to a user. Access management system 140 may provide access one or more resources. Access management system 140 may implement a sign-on system, e.g., a SSO system, which can establish an SSO session to provide SSO access to one or more resources.

Resources may include, without restriction, a file, a web page, a document, web content, a computing resource, or an application. For example, system 100 may include resources such as applications 120 and/or content accessible through those applications 120. A resource may be requested and accessed using an application. For example, an application may request access to a web page from a resource server based on a URL identifying a requested resource. Resources may be provided by one or more computing systems, e.g., a resource server that provides access to one or more resources upon authentication of user 102 in a SSO system.

User 102 operating a client device, e.g., client device 104, may present one or more interfaces that accept input to enable a user to interact with an access management system (e.g., access management system 140). Examples of interfaces may include graphical user interfaces (GUIs) described with reference to FIGS. 6-9. The interfaces may be accessible using an application, e.g., application 108, executing on client device 104. An interface may receive input to request validation of the authenticity of access management system 140 before user 102 initiates an access process with access management system 140 for authentication of user 102. Upon receiving a request from user 102 to validate access management system 140, access management system 140 may initiate a process by which access management system 140 and client device 104 operated by user 102 engage in communications to enable the user to validate access management system 140. The communications between a user and the access management system 140 enable access management system 140 to verify that it is communicating with the actual user for establishing access for the user. The communications establish a 3-way handshake between a client device and access management system 140 to establish trust between a user and the access management system for an authentication to provide the user with access to resources.

Access management system 140 may be implemented by a computing system. The computing system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Access management system 140 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Access management system 140 may be implemented using hardware, firmware, software, or combinations thereof.

In some embodiments, access management system 140 may be implemented by multiple computing devices (e.g., access manager servers) deployed as a cluster in a data center, which allows for scalability and high availability. Multiple such geographically dispersed data centers with access manager server clusters can be connected (wired or wirelessly) to constitute a multi-data center (MDC) system. An MDC system may satisfy high availability, load distribution, and disaster recovery requirements of access servers within an enterprise computer network. An MDC system may act as a single logical access server to support SSO services for access management system 140.

Access management system 140 may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. For example, access management system 140 may include session engine 142, authentication engine 144, system validation manager 146, and personal information handler 148, each of which may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

FIG. 1 shows an example in which user 102 can engage in communication with access management system 140 to validate access management system 140 before an authentication process is initiated (e.g., a user submitting credential information). In this example, user 102 operating client device 104 may attempt to access a resource such as an application 108, e.g., any one of applications 120 or the resources accessible through applications 120. Applications 120 may be accessible to user 102 upon successful authentication of credential information for user 102. Before one of applications 120 is accessible to user 102 at client device 104, user 102 may be authenticated for a session that provides user 102 with access to applications 120. Client device 104 may initiate an authentication process by requesting access from access management system 140. The authentication process may include client device 104 displaying one or more GUIs to receive credential information of a user and submitting a request for authentication to access management system 140. Authentication may be established based on verifying user's 102 credential information.

In attempting to access an application, user 102 may operate an application (e.g., application 108) that manages access to a user's account via access management system 140. For example, application 108 is an access management application that may present GUIs, such as those depicted in FIGS. 6-9. Using application 108, user 102 may initiate a validation process to determine the authenticity of access management system 140 (i.e., whether access management system 140 is responsible for authentication of user 102). The validation process may include one or more communications 130 ("user validation communications") from client device 104 to access management system 140. The validation process may include one or more communications 132 ("system validation communications") from access management system 140 to one or more client devices, e.g., client device 104, associated with a user that initiates the validation process. Some embodiments of the validation process are described further below.

Communications between client device 104 and access management system 140 can be received through a gateway system. The gateway system may support access management services. For example, a single sign-on (SSO) gateway may implement one or more access agents, such as agent 106 (e.g., web gate agent), to balance and/or handle requests from clients and access management system 140.

In at least one embodiment, a validation process may be initiated in application 108 by user 102. Application 108 may present a GUI that prompts user 102 for credential information. Credential information may be requested when a user is no longer authenticated. The absence of a session or the expiration of a session, may prompt access management system 140 to request credential information from user 102 for a resource that is protected. Application may present a GUI that enables user 102 to request validation of access management system 140 before providing credential information. Upon initiating a request for system validation, a user validation communication 130 (e.g., a system validation request) may be sent from client device 104 to access management system 140 to initiate validation of access management system 140. Specifically, system validation may determine the authenticity of a computing system that handles authentication for access management system 140.

Upon receiving a system validation request, system validation manager 146 of access management system 140 may manage system validation. System validation manager 146 may determine temporary access information (e.g., a one-time password) for verification by user 102. Temporary access information may be constrained by one or more criteria (e.g., time). Examples of temporary access information may include a password, a code, a token, a key, or other information that is constraint by one or more criteria. Temporary access information may be generated upon receiving a system validation request or may be previously generated. Access management system 140 may store temporary access information in a data store 160 ("temporary passwords").

System validation manager 146 may send the temporary access information in a system validation communication 132 to client device 104 to be received by user 102. User 102 can operate client device 104 to send a user validation communication 130 to access management system 140 with the temporary access information. Access management system 140 can verify the temporary access information returned by the user to determine whether it matches what was previously sent to user 102.

Personal information handler 148 of access management system 140 may generate personal information that may only be known or accessible by the user. In some embodiments, the personal information may be obtained for a third party source (e.g., a financial system or system providing personal information) not part of the access management system being validated. User 102 may have registered with access management system 140 previously, providing information to access personal information from one or more sources, e.g., a third party system. Personal information may include recent information associated with the user that may otherwise be inaccessible by an unauthorized user that does not have the privilege to access the information. Personal information may be stored in a data store, e.g., data store 170 ("personal information"). Recent personal information may include, for example, financial information obtained from current financial records (e.g., bank records). To ensure that the personal information is based on current records, personal information handler 148 may determine personal information after system validation manager 146 verifies the temporary access information.

System validation manager 146 may send a system validation communication 132 to client device 104 including the personal information. Client device 104 may present an interface to display the personal information and using the interface, user 102 can indicate whether the personal information is correct. The interface may accept credential information to determine authentication of the user if the user indicates that the personal information is correct. If the personal information is not correct, the user can indicate so and can choose to not provide credential information. Thus, verification of the personal information enables user 102 to determine whether access management system 140 is authentic. If the personal information is not correct, then user 102 can determine that access management system 140 is not authentic, and thereby preventing the user for sharing credential information to a possibly unauthorized computing system.

Resources (e.g., applications 120) may be accessible to user 102 based on successful authentication of credential information. Upon receiving the credential information, session engine 142 may verify whether a requested resource, e.g., application 170, is a protected resource that requires credentials for access. Session engine 142 may request authorization engine 144 to determine whether access to a resource is protected. Upon determining that access determines that the resource is not protected, session engine 142 may grant access to a resource. Upon determining that access to a resource is protected, session engine 142 may determine authentication of user 102 based on the credential information. Upon determining authentication of user 102, authorization engine 144 may determine whether user 102 is authorized to access a resource based on access permitted to user 102. Session engine 142 may send a communication to client device 104 to indicate whether access to a resource is permitted by user 102. Application 108 may be enabled to user 102 based on whether access is permitted.

Access management system 140 may provide many SSO services including management of access (e.g., granting/denying access) to resources, automatic sign-on, application password change and reset, session management, application credential provisioning, as well as authentication of a session. In some embodiments, access management system 140 can provide automatic single sign-on functionality for applications 120, such as Windows® applications, Web application, Java® applications, and mainframe/terminal-based applications running or being accessed from client devices. As explained above, access management system 120 may perform authentication of a user (e.g., user 102) operating a client device (e.g., client device 104). Authentication is a process by which a user verified to determine that he/she is who he/she claims to be.

In some embodiments, access management system 140 may use one or more policies stored in a data store 180 ("policies") to control access to resources. Policies 180 may include an authentication policy that specifies the authentication methodology to be used for authenticating the user for whom the access must be provided on a given resource. Policies 180 define the way in which the resource access is to be protected (e.g., type of encryption, or the like). Policies 160 may include an authorization policy that specifies the conditions under which a user or group of users has access to a resource. For example, an administrator may only authorize certain users within a group to access particular resources. Access management system 140 may determine authentication for an SSO session based on one or more of policies 180.

Access management system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management system 140 is coupled to or includes one or more data stores for storing data such as temporary passwords 160, personal information 170, and policies 160. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Session engine 142 may handle processing to determine whether a valid session exists for user 102 to access a resource. Session engine 142 checks for a valid session for user 102 to access a requested resource that is protected. Session engine 142 may assess validity of a session for user 102 based on consideration of one or more access policies applicable to user 102. Based on determining that a valid session does not exist for user 102, session engine 102 may request 108 credential information ("credentials") from user 102. Successful authentication of the credential information may provide the user with access to one or more resources, which may include a requested resource.

A request may be communicated to client device 104, which in response, prompts user 102 for user credentials to determine authentication of a session. The request may include information (e.g., a URL) to a web page or a user interface (e.g., a web page, portal, or dashboard) to receive credential information. The request may be communicated to client device 104, which in response prompts user 102 for user credentials to determine authentication of a session.

Session engine 142 may perform operations to authenticate credential information for user 102. In some embodiments, session engine 142 may store information about sessions established upon successful authentication of a user. For a SSO session (e.g., SSO authenticated sessions), the SSO session may be managed as a SSO session enabling access to all resources accessible to user based upon successful authentication of credential information for a user.

In some embodiments, session engine 142 may communicate with authorization engine 144 regarding the scope of authentication. Authorization engine 210 can determine resources that are protected and based on authentication sessions 150, can determine resources that are permitted and/or restricted for a session.

In some embodiments, access management system 140 may be implemented in system 100 according to an agent-server model for communication between client device 104 and any one of access manager servers implemented for access management system 140. The agent-server model may include an agent component (e.g., a gateway system) and a server component. The agent component may be deployed on a host system and the server component may be deployed on a server, e.g., an access manager server. User 102 operating client device 104 may communicate with access management system 140 via agent 106 using an enterprise computer network. Client device 104 may be a workstation, personal computer (PC), laptop computer, smart phone, wearable computer, or other networked electronic device.

Agent 106 may provide access control and may operate to protect access management system 140 and any resources accessible through access management system 140 against external and internal web-based threats. Access management system 140 may communicate with one or more resource computing systems (e.g., resource servers) that provide access to one or more resources, e.g., applications 120. Agent 106 may implement or operate as the agent component access management system 140 and may include a server that operates as the server component. Each resource accessible by access management system 140 may be protected through an agent, e.g., agent 106. Agent 106 may intercept user requests for one or more resources protected by it and check for user credentials in order to authenticate the user. The agent may then contact a server, e.g., an access manager server at access management system 140. The access management server may verify whether a resource is a protected resource that requires credentials for access. If the access management server determines that the resource is not protected, agent 106 may grant access to user 102. If the resource is protected, agent 106 may request user 102 to provide authentication credentials.

In some embodiments, communication between agent 106 and access management system 140 may be split into two different channels of communication. For example, communication via a front-channel may use a hypertext transfer protocol secure (HTTPS) protocol. Front-channel communications may include less frequent communications, such as communications for credential collection operations for authentication. Communication via a back-channel may use an open access protocol (OAP). Back-channel communications may include more frequent communications, such as agent-server interactions including requests for access to a resource managed by access management system 140. Each channel may communicate using an access token designed for the type of communication over the channel. The access flow may generate two types of browser tokens. A first token is an access management ID token (e.g., OAM_ID token), which serves the SSO requests that are being propagated over HTTP. A second token is an authorization token (e.g., OAMAuthn Token) that may be used to server the SSO requests that are being propagated over OAP. The browser tokens may be stored as host cookies at client device 104.

Access management system 140 (e.g., using agent 106) may present user 102 with a request for authentication credentials in the form of a challenge (e.g., via the user's web browser at client device 104). In some embodiments, user 102 can access SSO user interface through a client executing on client device 104 or through a web browser on client device 104. The SSO user interface may be implemented at access management system 140. Access management system 140 may send, with request 108, the SSO user interface or information (e.g., a URL) enabling access to the SSO user interface.

In some embodiments, an SSO user interface can include a list of the applications user 102 commonly utilizes. User 102 can manage their credentials and policies associated with applications through the SSO user interface. When user 102 requests to access an application, e.g., application 140, through the SSO user interface, a request may be sent from client device 104 to access management system 140 to determine a policy type for the application from one or more policies 160 applicable to user 102. Access management system 140 may determine whether a valid session exists for the user and if so, then it can determine user's 102 credential information based on the policy type.

In some embodiments, the request may include an authentication cookie from a previous login that can be used to determine whether user 102 is authorized to retrieve the credential. If authorized, the user can be logged into the application using the credential. In some embodiments, agent 106 can enable users to access applications 120 using SSO services provided by access management system. Access may be provided through a web browser directly, without first accessing the SSO user interface or using a client executing on client device 104. If user 102 is not authorized, then access management system may request 108 credentials from user 102. The SSO user interface may present an interface to receive input including credential information. The credential information may be sent 110 to access management system 140 to determine authentication of user 102.

In some embodiments, credential types can be supported, such as Oracle Access Management protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For OAM protected resources, user requests can be authenticated and then directed to URLs associated with the requested resources. For Federated Applications, links to federated partners and resources can be provided, including business to business (B2B) partner applications and SaaS applications. For form fill applications, templates can be used to identify fields of application web pages through which credentials can be submitted.

In some embodiments, the SSO user interface that receives input for providing authentication credentials may include one or more interactive elements to initiate system validation. Examples of interfaces may include those described with reference to FIGS. 6-9.

Figure 2:
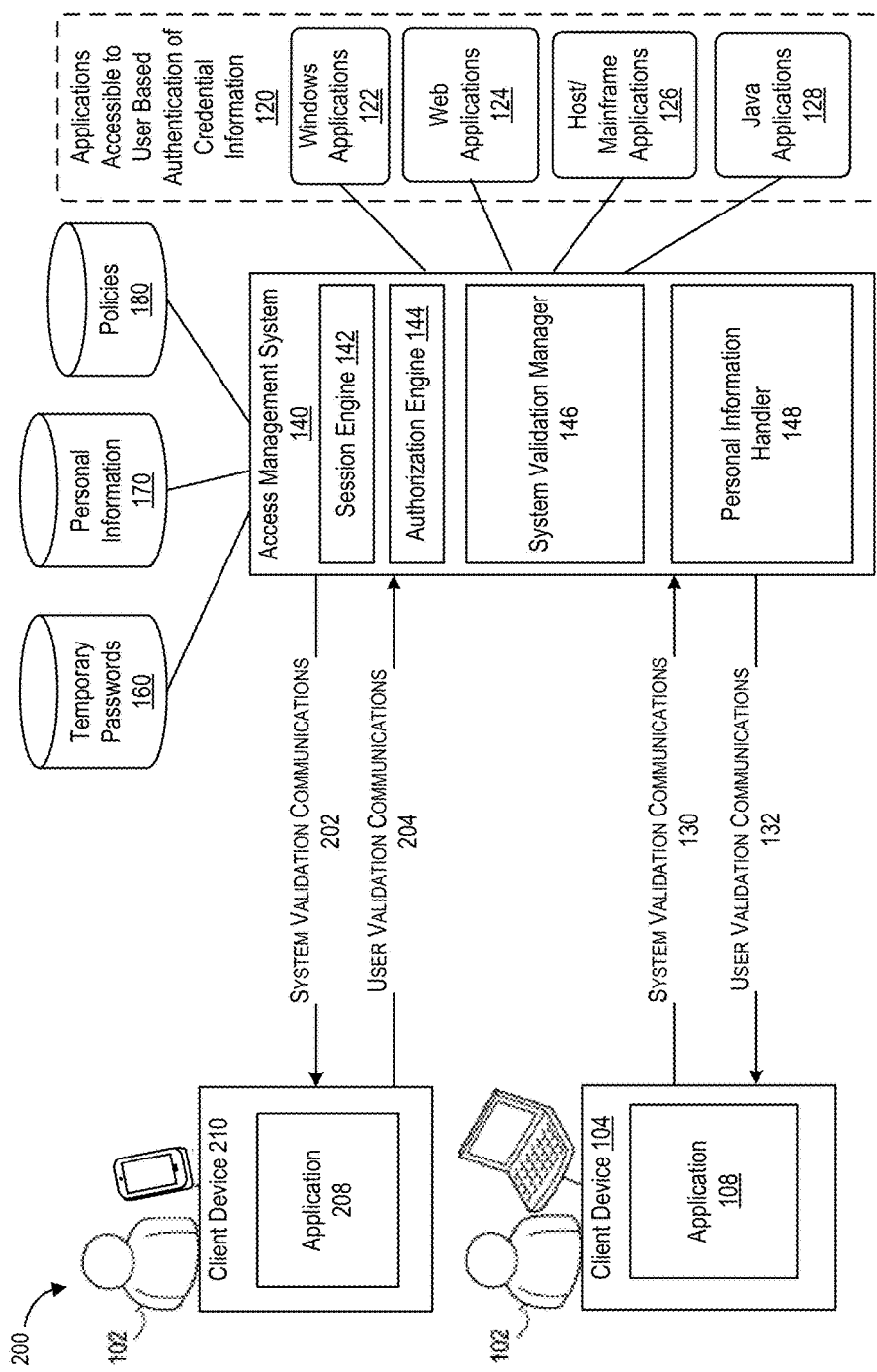
FIG. 2 illustrates a high-level diagram of a system for enabling a user to validate the authenticity of an access management system, in accordance with an embodiment.

Now turning to FIG. 2, a system 200 is illustrated in which user 102 can initiate a process to validate the authenticity of access management system 140. The example shown in FIG. 2 may include elements of FIG. 1. In the example shown by system 200, validating the authenticity of access management system 140 may be facilitated by one or more communications between access management system 140 and client device 104 that initiates validation of access management system 140 and by one or more communications between access management system 140 and one or more destinations, such as a client device 210. A destination may not be physically located with client device 104. Destinations may correspond to a location, such as an email address or a telephone number, at which data can be communicated from and/or received. A destination may be accessible to a user operating client device 104 such that the user can faciliate validation of access management system 140. A destination may enable a user to receive information from and/or send information to access management system 140.

Communication with a destination may be considered out-of-band such that the communication is with a device that is not located at client device 104 and/or that a different communication mechanism is used than communication with client device 104. Communication with a destination may enable secure communication of information for validation of access management system 140 so as to prevent unauthorized users from obtaining access to information used for validation of access management system 140. In at least one embodiment, validation of access management system 140 may include access management system 140 sending one or more communications 202 ("system validation communications") to one or more destinations, e.g., client device 210. Validation of access management system 140 may include a destination sending one or more communications 204 ("user validation communications") to access management system 140.

In at least one example, access management system 140 may send one or more system validation communications 202 to client device 210 to provide information such as temporary access information and/or personal information as part of validation of access management system 140. A user operating client device 104 can access a destination to send a user validation communication 204 to access management system to confirm receipt of information. A user can access the destination to obtain information from access management system 140 and respond to access management system 140 from client device 104 with information obtained from the destination. In this manner, information may be communication between access management system 140 and a user in a secure manner to reduce if not prevent unauthorized users from obtaining information for validation of access management system 140. The use of a client device 104 and a destination further ensures that information for validation is received and/or verified. In some embodiments, application 208 at a destination such as client device 210 may provide an interface to facilitate communication of information for validation of access management system 140.

In some embodiments, access management system 140 may support a registration process by which a user operating client device 104 can register one or more destinations for validation of access management system 140. Registration may include storing information about the destination. Each registered destination may be stored with user identification information of a user that registers the destination. Access management system 140 may identify destinations based on user identification information provided by a user. A user may specify one or more criteria (e.g., time) for a destination such that access management system 140 may communicate with a destination according to the criteria. Now turning to FIGS. 3 and 4, examples are illustrated of validation of an access management system 140.

In some embodiments, such as those described with reference to FIGS. 3-9, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to FIGS. 3-9, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by a computing system of an access management system, e.g., access management system 140 of FIGS. 1 and 2. The particular series of processing steps in this disclosure are not intended to be limiting. Other sequences of steps may also be performed according to alternative embodiments. For example, alternative embodiments of the present invention may perform the steps outlined above in a different order. Moreover, the individual steps illustrated in the figures may include multiple sub-steps that may be performed in various sequences as appropriate to the individual step. While processing depicted in FIGS. 3-9 may be described with respect to accessing a single resource, such processing may be performed for multiple resources, such that validation of a computing system of an access management system can be requested each time a resource is accessed and/or authentication of a user needs to be determined for access to a resource. Processing depicted in FIGS. 3-9 may be described with respect to multiple sessions, each for which validation of a computing system of an access management system may be requested. Furthermore, additional steps may be added or removed depending on the particular applications. One of ordinary skill in the art would recognize many variations, modifications, and alternatives.

In an aspect of some embodiments, each process in FIGS. 3-9 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

Figure 3:
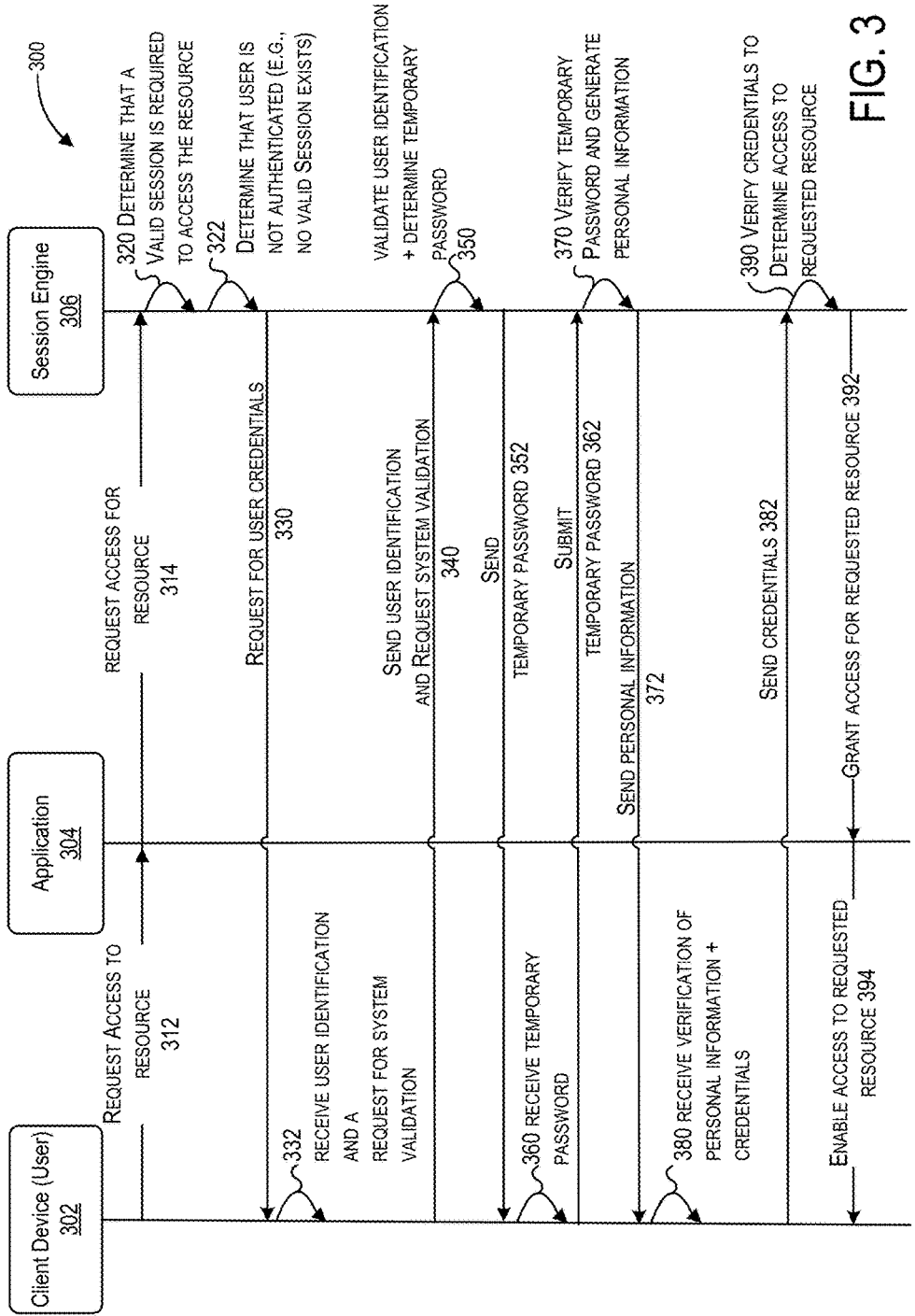
FIGS. 3-4 illustrate sequence diagrams showing operations for enabling a user to validate the authenticity of an access management system, in accordance with an embodiment.
Figure 4:
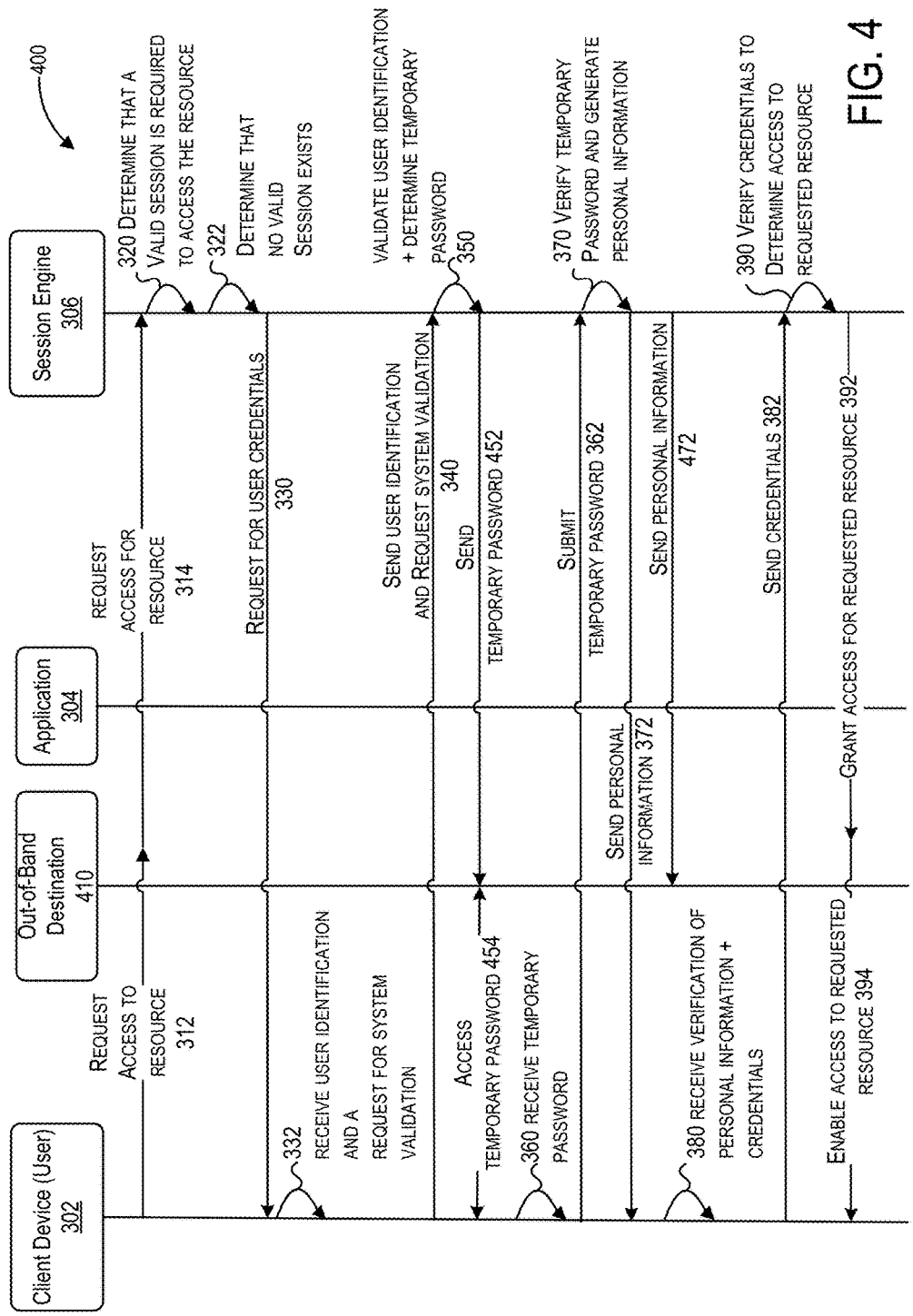

FIGS. 3-4 illustrate sequence diagrams showing operations for enabling a user to validate the authenticity of an access management system (e.g., access management system 140) in accordance with an embodiment. FIG. 3 shows a sequence diagram 300 for enabling a user to validate the authenticity of an access management system from a client device by which the user operates to access one or more resources.

Starting at step 312, a user operates client device 302 to request access to a resource ("requested resource") for which access is managed by an access management system. A session engine 306 of an access management system may be configured to manage access to resources. Session engine 306 may handle authentication of client device 302 to establish a session. Session engine 306 may be implemented on a server (e.g., authentication server) of the access management system. For example, session engine 306 may include or implement session engine 142 of FIG. 1.

As explained above, a resource may be an application or a resource accessible using an application. In the example of FIG. 3, client device 302 may be operated to request access to a resource through application 304. At step 314, application 304 may request access for a resource requested by client device 302. Application 304 may be an access management application that manages access by communicating with an access management system. A user can provide access credentials via application 304 to the access management system for authentication of the user. Session engine 306 may establish a session (e.g., a SSO session) upon successful authentication of the user. The session may enable user to access one or more resources from client device 302.

In some embodiments, a request to access a resource may be handled by an agent, such as a web gate. An agent may protect access to a resource provided by a server. Client device 302 may communicate with an access management system 140 by communicating, directly or indirectly via an agent, with session engine 306. An agent may intercept user requests for one or more resources protected by it to determine access to a requested resource. An agent may check for user credentials in order to authenticate a user for a session to access to those resources controlled by the access management system. An agent may determine whether a resource is protected and if so, whether an active session exists to enable access to the resource from client device 302 via application 304.

Session engine 306 may handle authentication of client device 302 to establish a session. Upon receiving a request to access a resource, session engine 306 may determine whether a valid session is required to access the resource, at step 320. For example, session engine 306 may determine whether access to the resource is protected. Access to a resource may be based on authentication of the user. Session engine 306 may determine whether a valid session is active for the user. The existence of a valid session may indicate that the user has been authenticated. Session engine 306 may determine whether the active session enables access to a resource such as the requested resource. In some embodiments, authentication may be specific to certain resources. In some embodiments, session engine 306 may assess the validity of a session for a user based on consideration of one or more access policies applicable to the user.

At step 322, session engine 306 may determine that the user is not authenticated to access the requested resource. Session engine 306 may determine that a user is not authenticated by determining that a valid session does not exist for the user. Upon determining that the user is not authenticated to access a resource, session engine 306 may send a request to client device 302 for user credential information ("request for user credentials"), at step 330. Client device 302 receives the request for credential information. In some embodiments, the request from step 330 may be received via application 304.

In response to a request for user credentials, client device 302 may provide an interface that enables client device to receive credential information. The interface may be provided in an application, e.g., application 304. An example of the interface is described below with reference to FIG. 6. The interface may include one or more interactive elements to enable a user to request validation of a system (e.g., an access management system that includes session engine 306) that is requesting the user's credentials. To request validation of a system, the interface may enable a user to input user credentials (e.g., user identification information) that identifies the user associated with the request. As described further below, session engine 306 may user identification information to determine a destination for communication related to validation of a system. At step 332, client device 302 may receive a request for system validation. Client device 302 may receive user identification information. At step 340, client device 302 may send a request for system validation to session engine 306. The request may be sent with the user identification information.

At step 350, session engine 306 may determine whether a user that requested system validation can request system validation. Session engine 306 may begin a system validation process to validate an access management system by accessing verify the user identification information. Session engine 306 may verify the user identification information by determining whether the user identification information is valid (e.g., exists) and if so, whether it is associated with the user. Session engine 306 may access an identity management system to verify the user identification information.

Session engine 306 may receive, from the identity management system, communication preferences associated with the user identification information, upon the session engine 306 verifying the user identification information (i.e., determining that the user identification information is valid and that the user identification information is associated with the user). The communication preferences may indicate one or more destinations designated to receive temporary access information for system validation. Session engine 306 can communicate with the destination(s) to provide temporary access information.

At step 350, session engine 306 may determine temporary access information (e.g., a one-time password) for the user that requested system validation of the access management system. Temporary access information may be used as part of a process of system validation. The temporary access information may be generated by an access management system and/or may be obtained from a third party system. In some embodiments, temporary access information may be generated in advance of a request for system validation. The temporary access information may be associated with one or more constraints that limit use of the temporary access information for a restricted period of time.

At step 352, session engine 306 can send the temporary access information to the user that requested system validation. The temporary access information may be sent to the user at one or more destinations identified based on the communication preferences of the user. As explained above, the communication preferences may be retrieved using the user identification information. In some embodiments, a destination may include the client device (e.g., client device 302) that requested system validation. By default (e.g., when the user has not provided communication preferences), the temporary access information can be sent to the client device (e.g., 302) that requested system validation. Temporary access information may be communicated to a client device using one or more communication systems, e.g., a messaging service.

A user that requested system validation may operate client device 302, at step 360. A user may operate client device 302 to obtain the temporary access information. Client device 302 may provide an interface with one or more interactive elements that receive temporary access information. The user may operate client device 302 to provide temporary access information in the interface. Client device 302 receives the temporary access information provided into the interface. At step 362, client device 302 may send the temporary access information to the access management system (e.g., session engine 306) to continue the process for system validation.

At step 370, session engine 306 may verify the temporary access information. Verifying the temporary access information may include determining whether the constraints of the temporary access information are satisfied. For example, where the temporary access information is associated with a time limit, session engine 306 can determine whether the temporary access information has expired based on the time limit. The temporary access information may not be accepted for system validation when the constraints are not satisfied (i.e., when the temporary access information has expired). Verifying the temporary access information may include determining whether the temporary access information matches the temporary access information send to client device 302 at step 352. The temporary access information may be stored in association with the user identification information of the user that requested system validation.

Further at step 370, session engine 306 may determine personal information as part of system validation. The personal information may be determined upon verifying temporary access information. The personal information may be generated by session engine 306. In some embodiments, the personal information may be obtained for a third party source (e.g., a financial system) not part of the access management system being validated. The personal information may include recent information associated with the user that may otherwise be inaccessible by a user (e.g., unauthorized user) that is not the holder of the user identification information. Recent information may include, for example, financial information obtained from current financial records (e.g., bank records). To ensure that the personal information is based on current records, session engine 306 may determine personal information upon verifying the temporary access information.

At step 372, session engine 306 may send the personal information to a client device associated with the user that requested system validation. The client device may be that which requested system validation. By sending the personal information to a client device that is known to be associated with the user, session engine 306 is assured that the personal information may not be sent to a user unauthorized to access the personal information. The user operating client device 302 can be assured that the personal information is from a trusted source that is validated as an authorized access management system. At step 380, a client device associated with the user that requested system validation may display personal information for the user to verify. For example, the personal information may be displayed in an interface. It is assumed that the client device that requested system validation may be the one that receives the personal information. Because the personal information is sent by an access management system as part of system validation, the personal information may be accurate and current with the respect to the user that requested system validation. The personal information may be determined based on a recent query of personal information about the user after the user requested system validation.

At step 380, client device 302 may present user with an interface that enables the user to provide input to verify that the personal information is correct. Upon verifying that the personal information is correct, client device 302 may present the user with an interface to receive credential information corresponding to the user identification information of the user. The system validation process may be complete by the user submitting credential information upon verifying that the personal information is accurate. Client device 302 may send the credential information 382 to the session engine 306 for verification.

At step 390, session engine 306 may verify the credential information for the user. Verifying the credential information may include determining whether the credential information matches previously established credential information associated with the user identification information of the user. Access to the requested resource at step 312 may be granted based on verifying that the credential information is correct. At step 392, session engine 306 may grant access to a requested resource. Access may be granted by storing information that indicates access is granted. Session engine 306 may send data to client 302 indicating information about access that is granted. In some embodiments, data about access that is granted may be sent to application 304. At step 394, application 304 may enable access to the resource (e.g., application 304) based on receiving data from session engine 306 indicating that access has been granted.

Now turning to FIG. 4, a sequence diagram 400 is shown for enabling a user to validate the authenticity of an access management system from using multiple client devices. Specifically, sequence diagram 400 shows that system validation of an access management system may be facilitated using an out-of-band communication channel. For example, the system validation described with reference to FIG. 3 may be enhanced by adding out-of-band communication with a destination 410 ("out-of-band destination") that is physically separate from client device 302. For example, destination 410 may be a client device that is in the control of the user operating client device 302 and that is different from client device 302. Destination 410 may be a mobile communication device and client device 302 may be a desktop computer. The out-of-band communication may improve security the system validation process by preventing or making it more difficult for unauthorized users (e.g., hackers or identity thieves) are unable to obtain sensitive information such as personal information and temporary access information.

Based on the example shown in FIG. 3, the examples in FIG. 4 illustrate communications with an out-of-band destination as part of the system validation. An out-of-band destination may be useful to enable a user to receive and/or send important communications as part of system validation without compromising the information sent in the communications. Security may be improved by communication with the destination as hackers may not have knowledge of the destination. As such, hackers may be unable to access or intercept information such as personal information and temporary access information.

A user operating client device 302 may register with an access management system before any of the processes, such as system validation, depicted in FIGS. 3 and 4 occur. A user may register by providing information about the user including information about one or more destinations for system validation. The information about destinations may include device information about one or more client devices controlled by the user and or any information about other types of destinations (e.g., email account information). The information about the user may be stored in association with user identification information and credential information. In some embodiments, the user may register information with an identity management system that is accessible to an access management system. Registration may include the user providing information about destinations. An access management system may communicate with a user for system validation via a client device that initiates system validation and/or one or more of out-of-band destinations.

The example shown in FIG. 4 may include elements similar to FIG. 3. A user operating client device 302 may request access to a resource controlled by an access management system including session engine 306. As part of obtaining access to a requested resource, a user may initiate system validation of the access management system. Upon initiating system validation, session engine 306 can communicate with the user via out-of-band destination 410 for one or more steps of the system validation process.

In some embodiments, after determining temporary access information at step 350, session engine 306 may send the temporary access information to one or more destinations that are different from client device 302. For example, at step 452, session engine 306 may send temporary access information (e.g., a temporary password) to destination 410. Session engine 306 may send temporary access information to destination 410 in addition to or as an alternative to sending the temporary access information to client device 302. In the cases when the temporary access information is not sent to client device 302, the user operating client device 302 may have to obtain the temporary access information from destination 410. At step 454, the destination, if a device, can send the temporary access information to client device 302, or the user may be able to obtain the temporary access information from destination 410 if accessible to the user. As explained above, the temporary access information is provided by the user to the access management system as part of the system validation process. In FIG. 4, at step 360, client device 302 may receive temporary access information from the user as input or from destination 410, at step 454.

In some embodiments, as part of system validation, an access management system may send personal information to one or more out-of-band destinations (e.g., destination 410) in addition to or as an alternative to sending personal information to client device 302. For example, after generating personal information at step 370, session engine 306 may send personal information to destination 410. To enhance security for system validation, personal information may be sent to an out-of-band destination to prevent access by unauthorized users. Unauthorized users may be unaware of the existence of a destination, and even if so, may not be aware that the personal information relates to a system validation process. In some embodiments, the personal information may be shared between client device 302 that initiates system validation and one or more destinations that receive the personal information.

Continuing with the system validation process, the personal information, wherever received, may be assessed by the user to determine whether it is correct. In some embodiments, the system validation process may include providing an interface (e.g., interface in FIG. 8) to enable the user to provide input to indicate whether the personal information is correct. The interface may be presented to the user at client device 302, or destination 410. In the example of FIG. 4, an interface may be presented to the user at step 380. At step 380, client device 302 can receive input, via an interface at client device 302, indicating verification of the personal information.

Thus, by providing one or more destinations as part of system validation, the user the the access management system can be assured that no information was comprised by an unauthorized user during system validation.

Figure 5:
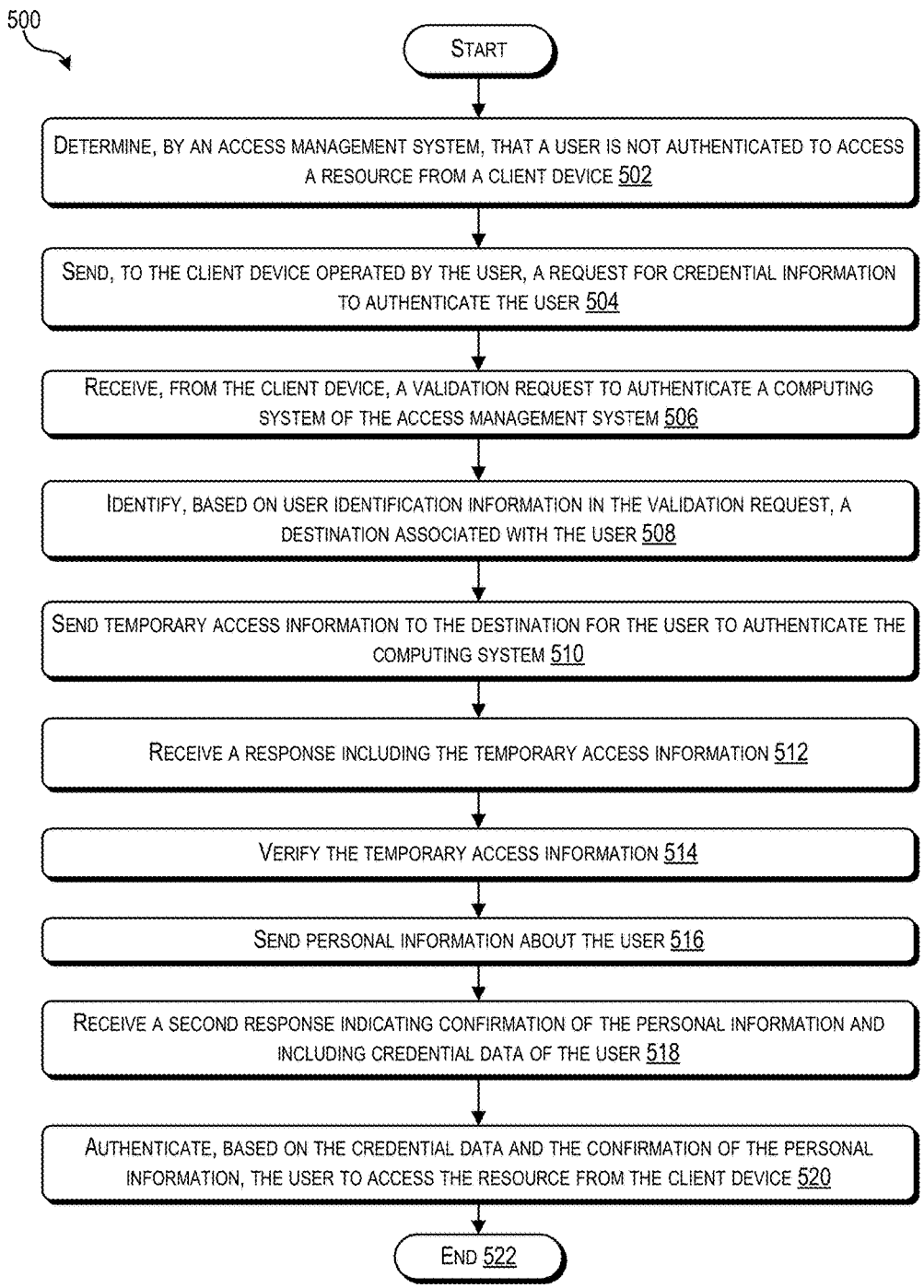
FIG. 5 depicts a flowchart illustrating a process for enabling a user to validate the authenticity of an access management system, in accordance with an embodiment.

FIG. 5 illustrates a flowchart 500 of a process for enabling a user to validate the authenticity of an access management system in accordance with an embodiment. In some embodiments, the process depicted in flowchart 500 may be implemented by access management system 140 of FIGS. 1 and 2.

Flowchart 500 may begin at step 502, by determining whether a user is authenticated for access from a client device. For example, an access management system may determine whether a user is authenticated to access a resource requested by the user. Authentication may be determined for access from a particular client device, e.g., a client device from which the user requests access. Authentication for a user may be determined based on credential information (e.g., a user identification and a password) provided by a user (e.g., received from a client device operated by the user). A user may be authenticated with access from a client device based on verification of the credential information.

In some embodiments, an access management system may determine whether a user is authenticated based on whether a valid session (e.g., an SSO session) exists for the user. A user may be authenticated upon determining that a valid session exists. In some embodiments, the access management system may determine whether a user has access to a resource requested by the user for a valid session, if one exists.

At step 504, a request may be sent to a client device operated by a user. The request may be sent for credential information of the user to authenticate the user. The request may be sent upon determining that the user is not authenticated (e.g., not authenticated to access a resource).

At step 506, a validation request may be received from the client device. The validation request may be submitted to request authentication of a computing system of an access management system. The computing system for which authentication is requested may be the same computing system that requested credential information from the user. In some embodiments, a user may submit a validation request may be submitted through a GUI, such as the one further described below with reference to FIG. 6. The GUI may receive input that includes user identification information. The user identification information may be included in the validation request. As described further below, the user identification information may enable the access management system to determine a destination for communication of temporary access information (e.g., a one-time password).

A destination associated with a user may be identified at step 508. The destination may be identified based on user identification information in a validation request (e.g., the validation request received at step 506). The user identification information may include user identification (e.g., a user name) or other information (e.g., a phone number or an email address) that uniquely identifies a user. In one example, an access management system may retrieve from an identity management system a profile of a user identified by the user identification information. The destination may be identified based on the profile, which indicates one or more destinations for communication with the user. Destinations may include an email address, a telephone number of a mobile device, or any other location where information can be sent.

At step 510, temporary access information may be sent to a destination. The destination may be that which is identified based on user identification information in a validation request. The temporary access information may be sent for the user to authenticate the computing system. The temporary access information may be a one-time password (OTP) for use by the user to confirm the sender of the temporary access information. The temporary access information may enable a user to verify that a computing system of the access management system is in fact an authentic computing system of the access management system.

To protect unauthorized access to a user's account managed by an access management system, an access management system may communicate with a user at a destination that is different from a client device. The destination may be out-of-band or out-of-channel from the client device, which requests validation of the access management system. The destination may be on a device that is accessible to the user or may be accessible (e.g., a location in memory or a location accessible at a remote computing system) to the user. The destination may be chosen such that is not known by an unauthorized system intending to deceptively gain access to a user's account. For example, a destination is a client device (e.g., a mobile device) that is different from the client device (e.g., a terminal) that sends the validation requests. In another example, a destination is an email address, to which an email message can be sent including the temporary access information. In some embodiments, a destination is the same client device from which the validation request is received.

At step 512, a response may be received from a client device (e.g., a client device that sends a validation request). The response may include the temporary access information that was sent to a destination. A user may obtain the temporary access information from the destination. In some embodiments, a GUI, such as the one shown with reference to FIG. 7, may be presented at the client device to receive the temporary access information obtained by the user from destination. The temporary access information may be included in the response upon receipt from the GUI.

The temporary access information received in the response at step 512 may be verified, at step 514. An access management system may determine whether the temporary access information received from a client device is the same as, or matches, the temporary access information that was sent to a destination. In some embodiments, the temporary access information may be limited or temporary such that it is associated with one or more constraints (e.g., a time period). The temporary access information, although received by a destination, may not be valid when the constraint(s) are not satisfied. Verifying the temporary access information may include determining whether the constraint(s) for the temporary access information have been satisfied.

At step 516, personal information about a user of a client device, which sent the validation request, may be sent to the client device. The personal information may be sent to the client device upon verifying that the temporary access information satisfies the constraints. As part of the validation of an access management system, the access management system may provide personal information about a user to enable a user to verify its authenticity before the user provides his/her credentials to the access management system. The personal information may include current information that would not be accessible to other computing systems, e.g., phishing or hacking computing systems designed to deceptively gain access to a user's account. The personal information may be supplied by one or more sources authorized by the user for access by the access management system. Examples of personal information may include financial information (e.g., recent transactions, recent account balance, or the like) or other private or confidential information. The personal information may include information that has been updated recently, such that the chance for unauthorized access may be unlikely.

When received by a client device, the personal information may be displayed in a GUI by the client device, such as the example described with reference to FIG. 8. Through the GUI, a user may verify the personal information to confirm its authenticity. The GUI may include one or more interactive elements to receive confirmation of the personal information and credential information (e.g., a password) for a user associated with the user identification information received with the validation request at step 506.

At step 518, a response may be received from a client device that requested validation of the access management system. The response may be received from the client device in response to input received via a GUI indicating verification that the personal information sent at step 516 is accurate. The response may include credential data of the user that confirmed the personal information. The credential data may include credential information (e.g., a password) for accessing an account associated with the user identification information received at step 506.

The user that sent the response at step 518, may be authenticated to determine access to a resource from the client device. The user may be authenticated based on the credential data received at step 518. The credential data may be compared to stored credential information for the user identification information of the user to determine whether they match. At step 520, a user may be authenticated to access a resource upon determining that the credential data matches the stored credential information. Upon authentication of a user, a session may be established for the user at the client device to access the resource. In some embodiments, the user may be further authenticated based on receiving confirmation in the response received at step 518. Access may be granted to the user based on determining that the user is authenticated to access the resource from the client device. The flowchart ends at step 522.

FIGS. 6-9 illustrate interfaces (e.g., GUIs) for enabling a user to validate the authenticity of an access management system in accordance with an embodiment. Each of the GUIs in FIGS. 6-9 may be display in an application, e.g., application 108 of FIG. 1. GUI 600 may be displayed by an access management application that manages access to one or more resources. GUI 600 may be generated by a client device, may be received from an access management system that generates the GUI, or a combination thereof. GUI 600 may be provided by an access management system via network as part of a service (e.g., a cloud service) or a network-accessible application. In at least one example, an operator of an access management system may operate a client device to interact with GUI 600.

Figure 6:
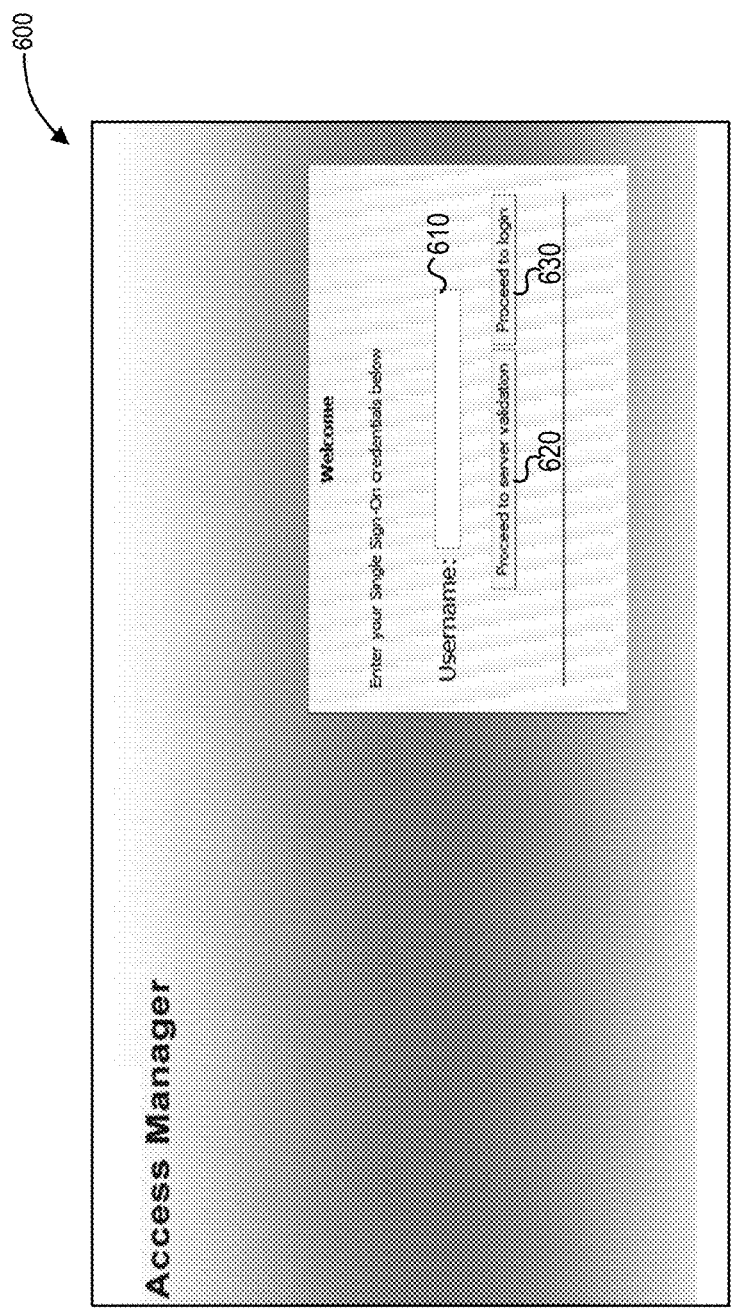
FIGS. 6-9 illustrate graphical user interfaces (GUIs) of a process for enabling a user to validate the authenticity of an access management system, in accordance with an embodiment.

Now turning to FIG. 6, a GUI 600 is depicted that enables a user to input credential information to establish a session (e.g., an SSO session) to access one or more resources. GUI 600 may include one or more interactive elements to enable a user to gain access to an account that provides a session. For example, GUI 600 may include an interactive element 610 to receive credential information such as user identification information (e.g., a username). GUI 600 may include an interactive element 630 that receives input to initiate an access process (e.g., a login process) for authentication of a user. An access process may enable a user to access an account managed by an access management system. By initiating the access process, a GUI described with respect to FIG. 9 may be displayed to receive input, e.g., credential information (e.g., a password) to determine access by the user associated with the user identification information.

In some embodiments, GUI 600 may include an interactive element 620 that receives input to initiate a validation request to determine the authenticity of a computing system that requests credential information via GUI 600. By initiating a validation request, a user may be enabled to determine whether an computing system asking for credential information is in fact an authentic (e.g., not fraudulent) system managing access to an account associated with the credential information.

Figure 7:
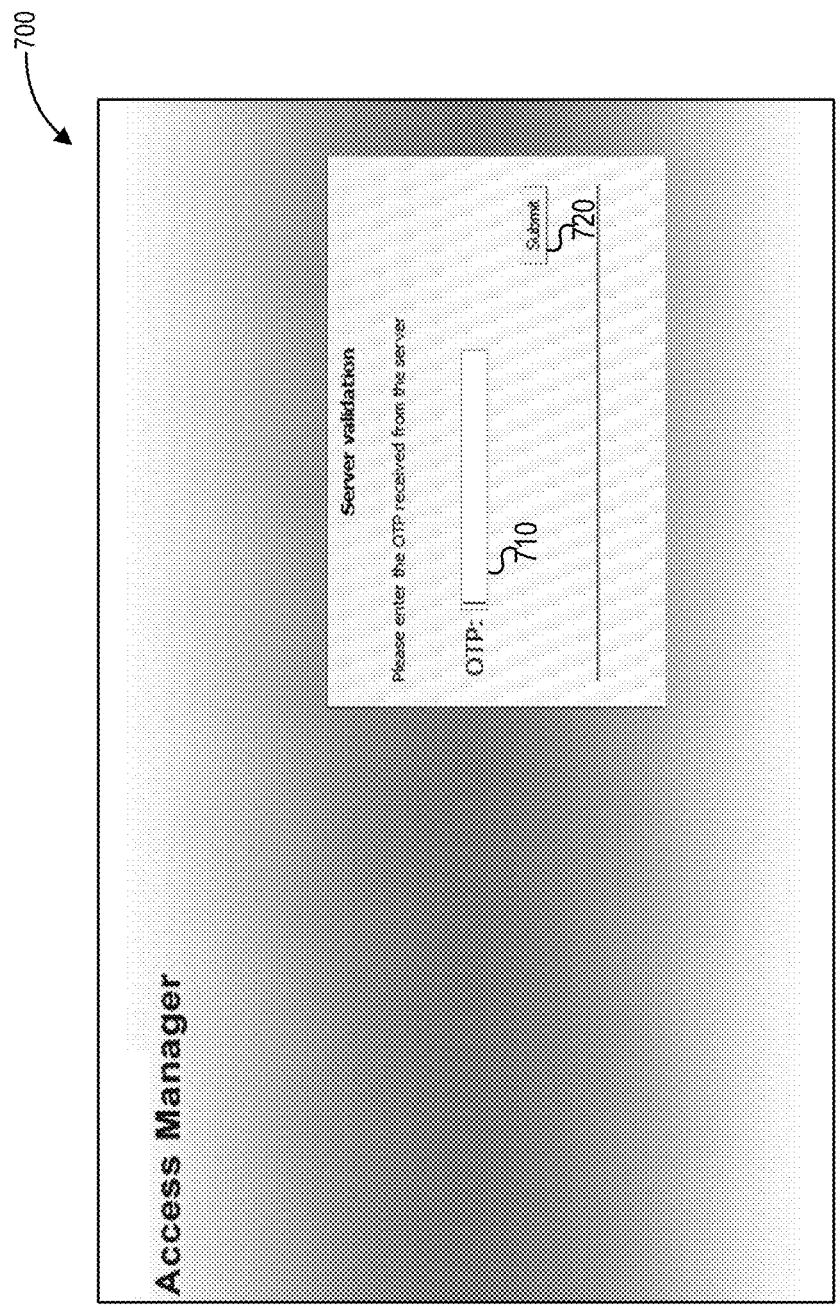

FIG. 7, a GUI 700 is depicted that enables a user to input temporary access information (e.g., a one-time password). As described above, temporary access information may be received by a client device from a computing system of an access management system as part of an authentication process. An access management system may establish its authenticity by sending temporary access information to a destination, e.g., a device different from a client device that requested validation of the access management system. As part of a process to validate an access management system, the access management system may send request a client device (e.g., the client device that initiated a validation request) to receive temporary access information sent to the destination. In some embodiments, a client device may display GUI 700 that receives temporary access information via an interactive element 710. GUI 700 may include an interactive element 720 that receives input to send (e.g., submit) the temporary access information to an access management system. The temporary access information may be submitted to an access management system. The access management system can confirm the user's verification of the temporary access information. The access management system can verify the temporary access information to determine whether it matches the temporary access information sent to a destination.

Figure 8:
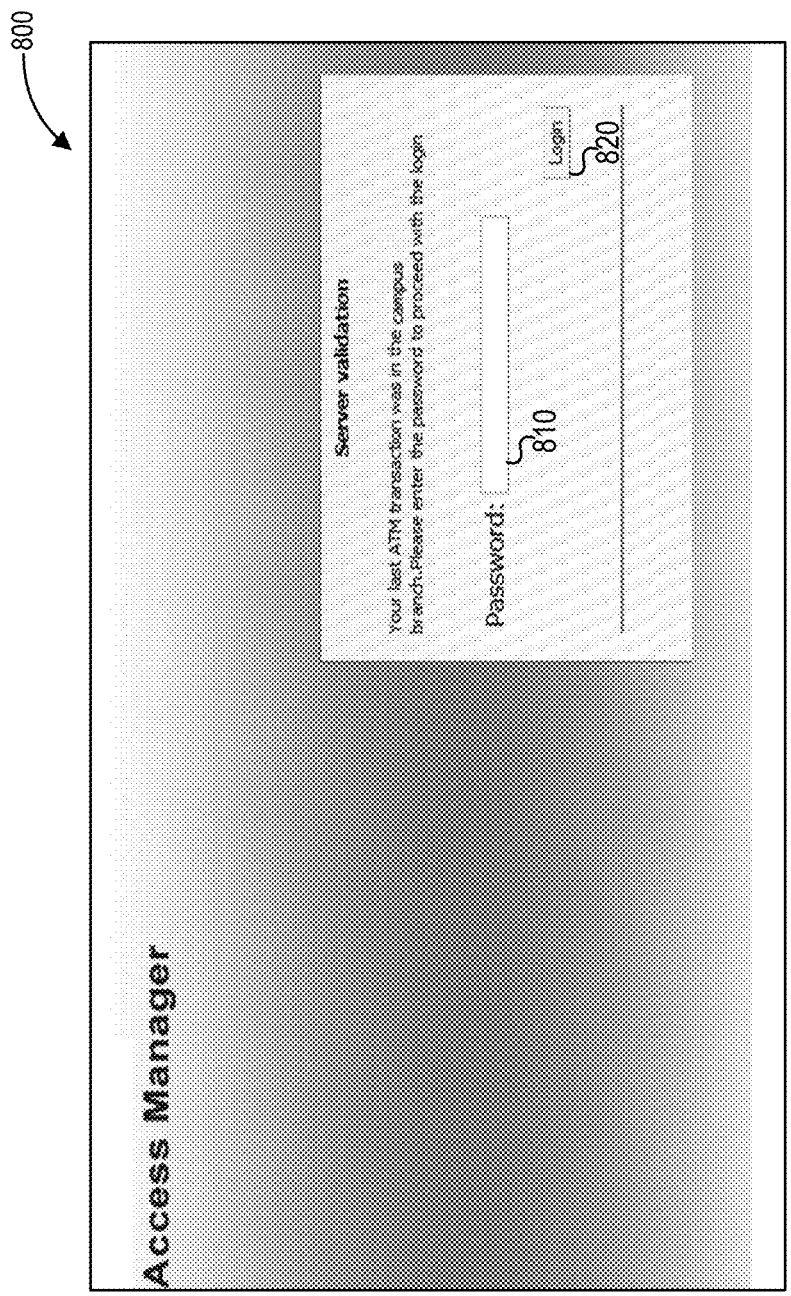

In FIG. 8, a GUI 800 is shown that enables a user to determine the authenticity of an access management system. GUI 800 may display personal information about a user that requested validation of an access management system. As described above, an access management system may send personal information about a user to a client device operated by the user that requests validation of the access management system. The personal information may be sent to the user upon verifying temporary access information received from the user. In some embodiments, personal information may be sent to the client device that initiates a request to determine the authenticity of the access management system.

The client device may display GUI 800 to provide the personal information for verification by the user operating the client device. The personal information may be provided as part of a process for validating the authenticity of an access management system. The user may view the personal information displayed by GUI 800 to determine whether it is accurate. GUI 800 may include one or more interactive elements to receive input to indicate whether the personal information is accurate. The interactive element(s) may enable a user to submit a request to an access management system to confirm the accuracy of the personal information. In some embodiments, the interactive element(s) in GUI 800 may receive input to send an access request (e.g., login request) to access an account of the user for which the personal information is displayed. For example, GUI 800 may include interactive element 820 that receives input for requesting access to an account. Upon receiving input via interactive element 820, an access request may be submitted to an access management system. GUI 800 may include interactive element 810 to receive access information (e.g., a password) to access an account of the user for which the personal information is displayed. The access information may correspond to user identification information received in the GUI described with reference to FIG. 6. The access information may be submitted with the access request to an access management system. The access management system can determine access to an account based on verifying the access information submitted using GUI 800.

Figure 9:
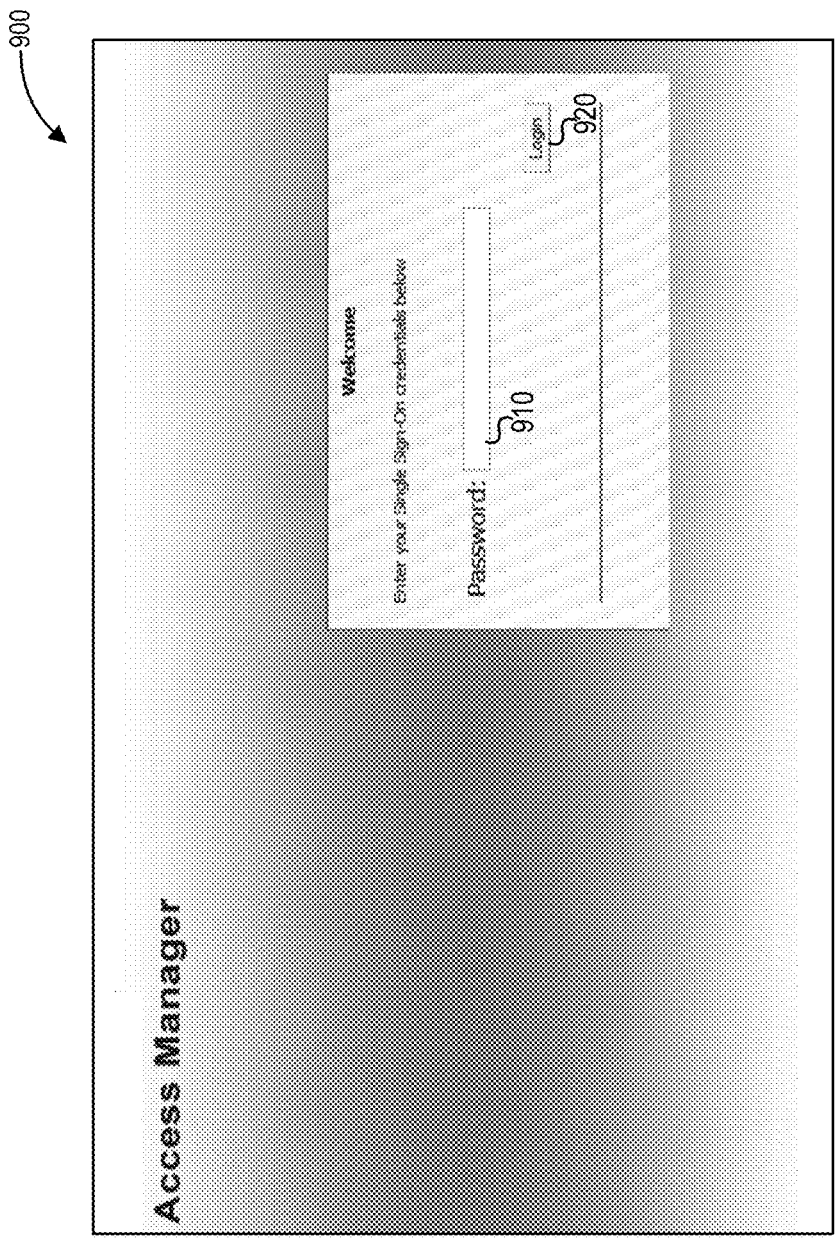

FIG. 9 depicts a GUI 900 that enables a user to provide access information (e.g., a password) to request access to an account associated with a user. The account may be identified by the user identification associated with the account. The user identification information may be provided in a different GUI, e.g., GUI 600 described with reference to FIG. 6. GUI 900 may be displayed upon initiation of an access process by interaction with interactive element 630 of FIG. 6. GUI 900 may include an interactive element 910 to receive credential information for the account. Interactive element 920 can be interactive to initiate a login process based on the credential information. In some embodiments, GUI 900 may be displayed when a user decides not to validate the authenticity of an access management system. In some embodiments, GUI 900 and GUI 600 may be combined to reduce the number of steps for a user to provide credential information for an access process.

Figure 10:
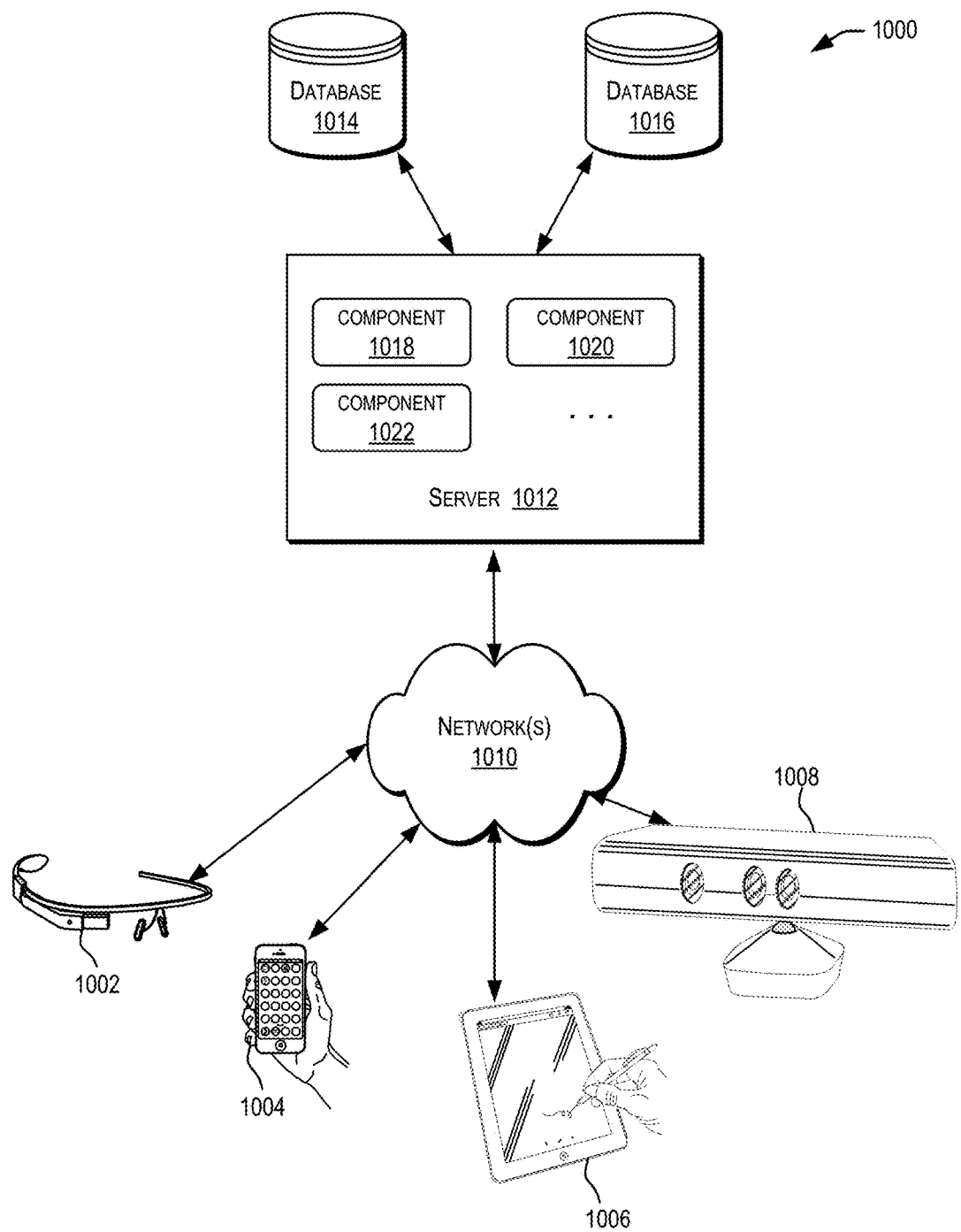
FIG. 10 depicts a simplified diagram of a distributed system for implementing an embodiment.

FIG. 10 depicts a simplified diagram of a distributed system 1000 for implementing an embodiment. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications. In certain embodiments, server 1012 may also provide other services or software applications can include non-virtual and virtual environments. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in FIG. 10 is thus one example of a distributed system for implementing an embodiment system and is not intended to be limiting.

Client computing devices 1002, 1004, 1006, and/or 1008 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1010.

Although distributed system 1000 in FIG. 10 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization. One or more flexible pools of logical storage devices can be virtualized to maintain virtual storage devices for the server. Virtual networks can be controlled by server 1012 using software defined networking. In various embodiments, server 1012 may be adapted to run one or more services or software applications described in the foregoing disclosure. For example, server 1012 may correspond to a server for performing processing as described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. These databases may provide a mechanism for storing information such as user interactions information, usage patterns information, adaptation rules information, and other information used by embodiments of the present invention. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle that are adapted to store, update, and retrieve data in response to SQL-formatted commands.

Figure 11:
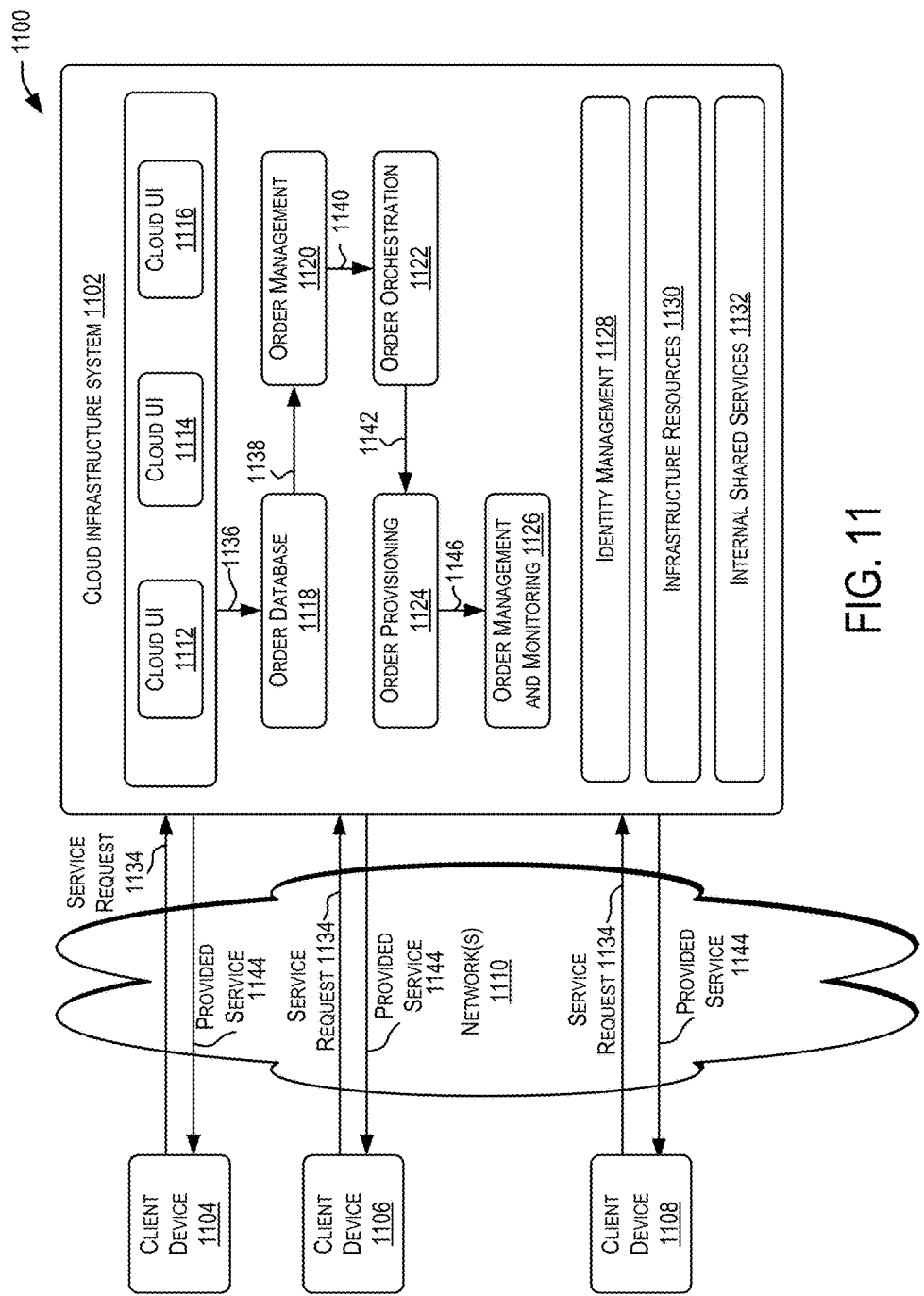
FIG. 11 illustrates a simplified block diagram of one or more components of a system environment in which services may be offered as cloud services, in accordance with an embodiment of the present disclosure.

In some embodiments, a cloud environment may provide one or more services. FIG. 11 is a simplified block diagram of one or more components of a system environment 1100 in which services may be offered as cloud services, in accordance with an embodiment of the present disclosure. In the illustrated embodiment in FIG. 11, system environment 1100 includes one or more client computing devices 1104, 1106, and 1108 that may be used by users to interact with a cloud infrastructure system 1102 that provides cloud services. Cloud infrastructure system 1102 may comprise one or more computers and/or servers that may include those described above for server 1012.

It should be appreciated that cloud infrastructure system 1102 depicted in FIG. 11 may have other components than those depicted. Further, the embodiment shown in FIG. 11 is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for client computing devices 1002, 1004, 1006, and 1008. Client computing devices 1104, 1106, and 1108 may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102. Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between client computing devices 1104, 1106, and 1108 and cloud infrastructure system 1102. Each network may be any type of network familiar to those skilled in the art that can support data communications using any of a variety of commercially-available protocols, including those described above for network(s) 1010.

In certain embodiments, services provided by cloud infrastructure system 1102 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1102 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1102 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle Corporation) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1102 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform, and other resources.

In some embodiments, resources in cloud infrastructure system 1102 may be shared by multiple users and dynamically re-allocated per demand. Additionally, resources may be allocated to users in different time zones. For example, cloud infrastructure system 1102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 to enable provision of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in FIG. 11, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In an exemplary operation, at step 1134, a customer using a client device, such as client computing devices 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI) such as cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

At step 1136, the order information received from the customer may be stored in an order database 1118. If this is a new order, a new record may be created for the order. In one embodiment, order database 1118 can be one of several databases operated by cloud infrastructure system 1118 and operated in conjunction with other system elements.

At step 1138, the order information may be forwarded to an order management module 1120 that may be configured to perform billing and accounting functions related to the order, such as verifying the order, and upon verification, booking the order.

At step 1140, information regarding the order may be communicated to an order orchestration module 1122 that is configured to orchestrate the provisioning of services and resources for the order placed by the customer. In some instances, order orchestration module 1122 may use the services of order provisioning module 1124 for the provisioning. In certain embodiments, order orchestration module 1122 enables the management of business processes associated with each order and applies business logic to determine whether an order should proceed to provisioning.

As shown in the embodiment depicted in FIG. 11, at step 1142, upon receiving an order for a new subscription, order orchestration module 1122 sends a request to order provisioning module 1124 to allocate resources and configure resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. This enables order orchestration module 1122 to be isolated from implementation details, such as whether or not services and resources are actually provisioned on the fly or pre-provisioned and only allocated/assigned upon request.

At step 1144, once the services and resources are provisioned, a notification may be sent to the subscribing customers indicating that the requested service is now ready for use. In some instance, information (e.g. a link) may be sent to the customer that enables the customer to start using the requested services.

At step 1146, a customer's subscription order may be managed and tracked by an order management and monitoring module 1126. In some instances, order management and monitoring module 1126 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1100 may include an identity management module 1128 that is configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
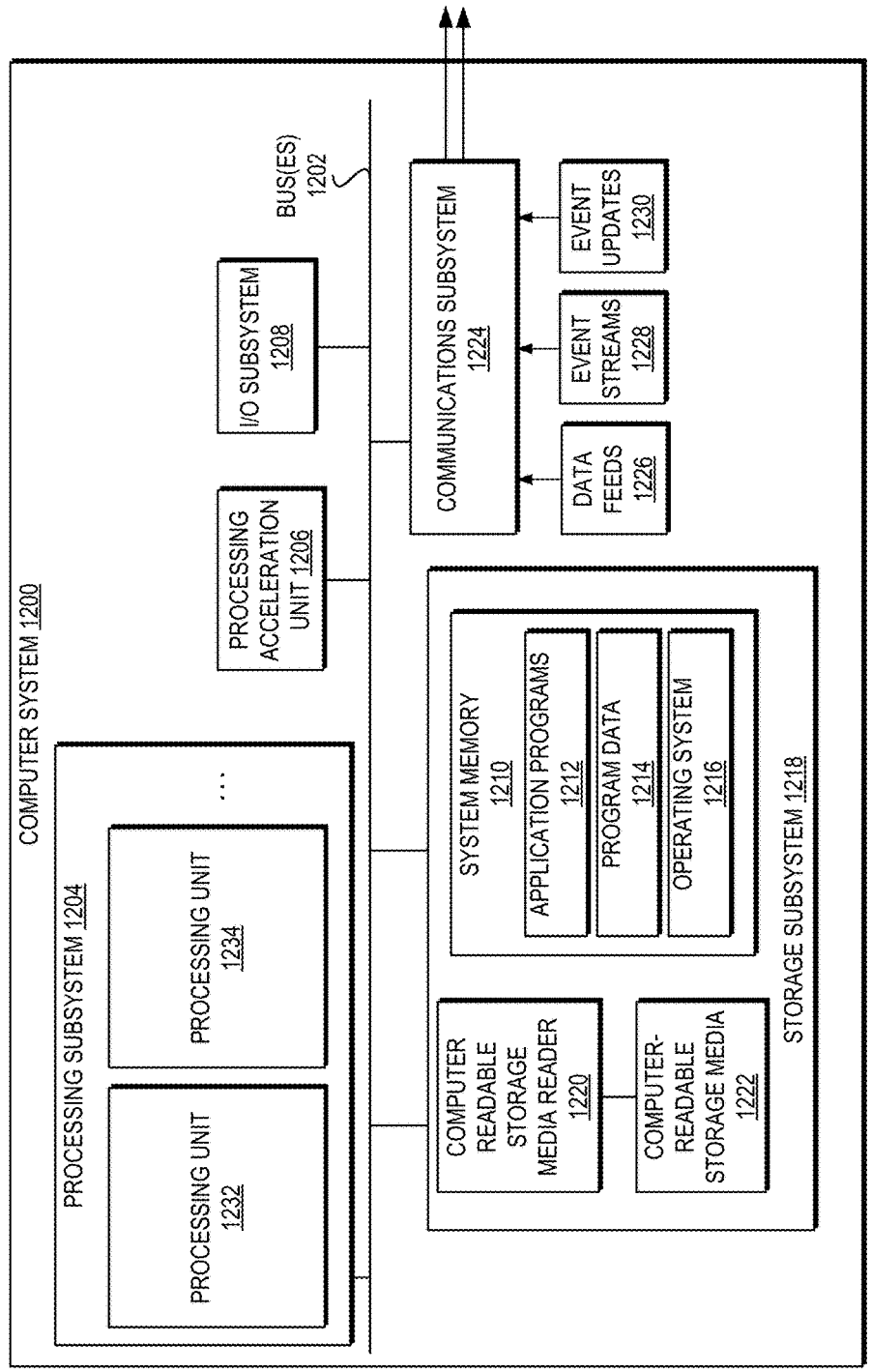
FIG. 12 illustrates an exemplary computer system that may be used to implement an embodiment of the present invention.

FIG. 12 illustrates an exemplary computer system 1200 that may be used to implement an embodiment of the present invention. In some embodiments, computer system 1200 may be used to implement any of the various servers and computer systems described above. As shown in FIG. 12, computer system 1200 includes various subsystems including a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 may include tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processing units 1232, 1234, etc. A processing unit may include be one or more processors, including single core or multicore processors, one or more cores of processors, or combinations thereof. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1222 including potentially on one or more storage devices. Through suitable programming, processing subsystem 1204 can provide various functionalities.

In certain embodiments, a processing acceleration unit 1206 may be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term "input device" is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information that is used by computer system 1200. Storage subsystem 1218 provides a tangible non-transitory computer-readable storage medium for storing the basic programming and data constructs that provide the functionality of some embodiments. Software (programs, code modules, instructions) that when executed by processing subsystem 1204 provide the functionality described above may be stored in storage subsystem 1218. The software may be executed by one or more processing units of processing subsystem 1204. Storage subsystem 1218 may also provide a repository for storing data used in accordance with the present invention.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM) or dynamic random access memory (DRAM).

By way of example, and not limitation, as depicted in FIG. 12, system memory 1210 may store application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1222 may store programming and data constructs that provide the functionality of some embodiments. Software (programs, code modules, instructions) that when executed by processing subsystem 1204 a processor provide the functionality described above may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1222 may provide storage of computer-readable instructions, data structures, program modules, and other data for computer system 1200.

In certain embodiments, storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for storing computer-readable information.

In certain embodiments, computer system 1200 may provide support for executing one or more virtual machines. Computer system 1200 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1200. Accordingly, multiple operating systems may potentially be run concurrently by computer system 1200. Each virtual machine generally runs independently of the other virtual machines.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client computing devices via the Internet for receiving and sending information from and to the client computing devices.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, communications subsystem 1224 may receive input communication in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. The modifications include any relevant combination of the disclosed features. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
  receiving, by a computing system of an access management system, from a computing device operated by a user, a validation request to authenticate the access management system, the validation request including user identification information associated with the user;
  sending, by the computing system, to a destination associated with the user based on the user identification information, temporary access information for the user to authenticate the access management system;
  receiving, by the computing system, a first response including the temporary access information;
  upon verifying the temporary access information received in the first response, sending, by the computing system, personal information about the user to the computing device, the personal information being selected from current records of the user available from a third party system that is different from the access management system;
  receiving, from the computing device, a second response, the second response indicating a confirmation by the user of the personal information and the second response including credential data of the user; and
  determining, by the computing system, authentication of the user to access the resource from the computing device, wherein the authentication is determined based on the credential data and the confirmation of the personal information received in the second response.

2. The method of claim 1, further comprising:
  upon determining that the user is not authenticated to access the resource from the computing device, sending, to the computing device, a request for credential information of the user; and
  wherein the computing device sends the validation request in response to the request for credential information.

3. The method of claim 1, wherein the destination is the computing device.

4. The method of claim 1, wherein the destination is a device associated with the user, and wherein the device is different from the computing device.

5. The method of claim 4, wherein the first response is received from the destination.

6. The method of claim 1, further comprising:
determining that the user identification information is associated with the user; and
identifying the destination based on the user identification information.

7. The method of claim 1, wherein the temporary access information is associated with a time period, wherein verifying the temporary access information includes determining a response time is within the time period, and wherein the response time is based on a time for receiving the first response after the temporary access information is sent to the computing device.

8. The method of claim 1, further comprising:
upon verifying the temporary access information received in the first response, generating the personal information before sending the personal information.

9. The method of claim 8, wherein the personal information includes financial information about the user determined after the temporary access information is verified.

10. An access management system comprising:
one or more processors; and
a memory coupled with and readable by the one or more processors, the memory storing a set of instructions that, when executed by the one or more processors, causes the one or more processors to:
receive, from a computing device operated by a user, a validation request to authenticate the access management system, the validation request including user identification information associated with the user;
send, to a destination associated with the user based on the user identification information, temporary access information for the user to authenticate the access management system;
receive a first response including the temporary access information;
upon verifying the temporary access information received in the first response, send personal information about the user to the computing device, the personal information being selected from current records of the user available from a third party system that is different from the access management system;
receive, from the computing device, a second response, the second response indicating a confirmation by the user of the personal information and the second response including credential data of the user; and
determine authentication of the user to access the resource from the computing device, wherein the authentication is determined based on the credential data and the confirmation of the personal information received in the second response.

11. The access management system of claim 10, wherein the set of instructions, when executed by the one or more processors, further causes the one or more processors to:
upon determining that the user is not authenticated to access the resource from the computing device, sending, to the computing device, a request for credential information of the user; and
wherein the computing device sends the validation request in response to the request for credential information.

12. The access management system of claim 10, wherein the destination is a device associated with the user, and wherein the device is different from the computing device.

13. The access management system of claim 10, wherein the set of instructions, when executed by the one or more processors, further causes the one or more processors to:
determine that the user identification information is associated with the user; and
identify the destination based on the user identification information.

14. The access management system of claim 10, wherein the temporary access information is associated with a time period, wherein verifying the temporary access information includes determining a response time is within the time period, and wherein the response time is based on a time for receiving the first response after the temporary access information is sent to the computing device.

15. The access management system of claim 10, wherein the set of instructions, when executed by the one or more processors, further causes the one or more processors to:
upon verifying the temporary access information received in the first response, generate the personal information before sending the personal information,
wherein the personal information includes financial information about the user determined after the temporary access information is verified.

16. A non-transitory computer-readable medium storing a set of instructions that, when executed by one or more processors, causes the one or more processors to:
receiving, by a computing system of an access management system, from a computing device operated by a user, a validation request to authenticate the access management system, the validation request including user identification information associated with the user;
sending, by the computing system, to a destination associated with the user based on the user identification information, temporary access information for the user to authenticate the access management system;
receiving, by the computing system, a first response including the temporary access information;
upon verifying the temporary access information received in the first response, sending, by the computing system, personal information about the user to the computing device, the personal information being selected from current records of the user available from a third party system that is different from the access management system;
receiving, from the computing device, a second response, the second response indicating a confirmation by the user of the personal information and the second response including credential data of the user; and
determining, by the computing system, authentication of the user to access the resource from the computing device, wherein the authentication is determined based on the credential data and the confirmation of the personal information received in the second response.

17. The non-transitory computer-readable medium of claim 16, wherein the set of instructions, when executed by the one or more processors, further causes the one or more processors to:
upon determining that the user is not authenticated to access the resource from the computing device, send, to the computing device, a request for credential information of the user; and
wherein the computing device sends the validation request in response to the request for credential information.

18. The non-transitory computer-readable medium of claim 16, wherein the destination is a device associated with the user, and wherein the device is different from the computing device.

19. The non-transitory computer-readable medium of claim 16, wherein the set of instructions, when executed by the one or more processors, further causes the one or more processors to:
   determine that the user identification information is associated with the user; and
   identify the destination based on the user identification information.

20. The non-transitory computer-readable medium of claim 16, wherein the set of instructions, when executed by the one or more processors, further causes the one or more processors to:
   upon verifying the temporary access information received in the first response, generate the personal information before sending the personal information,
   wherein the personal information includes financial information about the user determined after the temporary access information is verified.

\* \* \* \* \*